US012105052B2

(12) United States Patent
Arvanitis et al.

(10) Patent No.: US 12,105,052 B2
(45) Date of Patent: Oct. 1, 2024

(54) SYSTEMS AND METHODS FOR ULTRASOUND IMAGING AND FOCUSING

(71) Applicant: Georgia Tech Research Corporation, Atlanta, GA (US)

(72) Inventors: Costas Arvanitis, Atlanta, GA (US); Arpit Patel, Atlanta, GA (US); Scott Joseph Schoen, Atlanta, GA (US); Zhigen Zhao, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 677 days.

(21) Appl. No.: 17/291,504

(22) PCT Filed: Nov. 7, 2019

(86) PCT No.: PCT/US2019/060217
§ 371 (c)(1),
(2) Date: May 5, 2021

(87) PCT Pub. No.: WO2020/097298
PCT Pub. Date: May 14, 2020

(65) Prior Publication Data
US 2022/0011270 A1    Jan. 13, 2022

Related U.S. Application Data

(60) Provisional application No. 62/758,145, filed on Nov. 9, 2018.

(51) Int. Cl.
*G01N 29/06* (2006.01)
*G01N 29/22* (2006.01)
*G01N 29/34* (2006.01)

(52) U.S. Cl.
CPC ....... *G01N 29/0654* (2013.01); *G01N 29/221* (2013.01); *G01N 29/348* (2013.01);
(Continued)

(58) Field of Classification Search
None
See application file for complete search history.

(56) References Cited

U.S. PATENT DOCUMENTS 6,149,597 A * 11/2000 Kamiyama ............... A61B 8/14
600/458
6,176,829 B1 * 1/2001 Vilkomerson ...... G01S 15/8954
600/443
(Continued)

FOREIGN PATENT DOCUMENTS

JP    2006/130313    5/2006

OTHER PUBLICATIONS

International Search Report and Written Opinion from Application No. PCT/US2019/60217 dated Feb. 5, 2020.
(Continued)

*Primary Examiner* — Wen W Huang
(74) *Attorney, Agent, or Firm* — Troutman Pepper Hamilton Sanders LLP; Ryan A. Schneider; Dustin B. Weeks

(57) ABSTRACT

This disclosure describes systems and methods for ultrasound imaging and targeting. In one example, the systems and methods improve targeting and imaging through a heterogenous medium by using the angular spectrum approach (ASA) alone or in combination with passive acoustic mapping (PAM). In another example, the systems and methods improve the ultrasound imaging of vessels using microbubbles. The imaging of the vessels is also aided by the ASA and PAM. A closed loop controller is described that adjusts the ultrasound pressure provided to a region of interest to a desired pressure based at least in part on the harmonic, ultra-harmonic, sub-harmonic, or broadband frequency ranges for the microbubbles.

17 Claims, 25 Drawing Sheets

(52) U.S. Cl.
CPC .............. *G01N 2291/02475* (2013.01); *G01N 2291/02483* (2013.01); *G01N 2291/102* (2013.01)

(56) References Cited

U.S. PATENT DOCUMENTS

| | | | |
|---|---|---|---|
| 11,547,384 B2* | 1/2023 | Ebbini | ................. A61B 8/0891 |
| 2004/0210135 A1 | 10/2004 | Hynynen et al. | |
| 2012/0165670 A1 | 6/2012 | Shi et al. | |
| 2014/0371774 A1* | 12/2014 | Hwang | .................... A61B 8/54 |
| | | | 606/169 |
| 2015/0348277 A1* | 12/2015 | Frinking | ............... G06T 7/0014 |
| | | | 600/431 |
| 2016/0317121 A1 | 11/2016 | Frenz et al. | |
| 2017/0100092 A1* | 4/2017 | Kruse | ................. G01S 15/8997 |
| 2017/0196465 A1 | 7/2017 | Browning et al. | |
| 2017/0238898 A1 | 8/2017 | Waag et al. | |
| 2018/0125373 A1* | 5/2018 | Chang | ................... A61B 8/5269 |
| 2018/0317886 A1* | 11/2018 | Peng | ....................... A61B 8/481 |

OTHER PUBLICATIONS

Schoen, S., Jr. "Fast Acoustic Aberration Correction with the Angular Spectrum Approach," ARXIV Pre-Pring, Jun. 19, 2019, arXiv:1906.08156v1>.

Arvanitis, et al., "Closed-Loop Control of Cavitation Activity Using Passive Acoustic Mapping," Youtube Video Nov. 13, 2018 <URL: https://youtu.be/IFRAjAhQnyU>.

Arvanitis, C., et al., "Passive Acoustic Mapping with the Angular Spectrum Methods," IEE Trans Med Imaging Apr. 1, 2017; 36(4) pp. 983-993.

Arvanitis, C., et al., "Transcranial Assessment and Visualization of Acoustic Cavitation: Modeling and Experimental Validation," IEEE Trans Med Imaging Jun. 1, 2015; 34(6) pp. 1270-1281.

* cited by examiner

Simulated Propagation

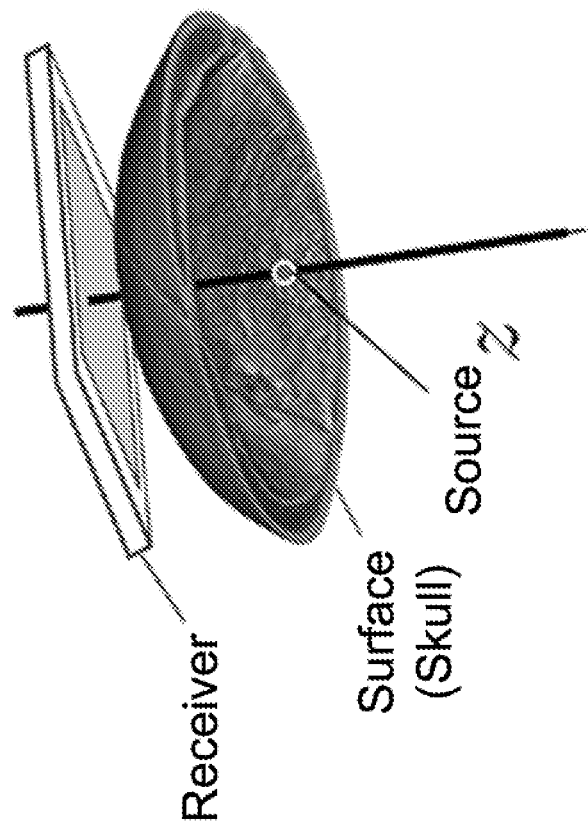
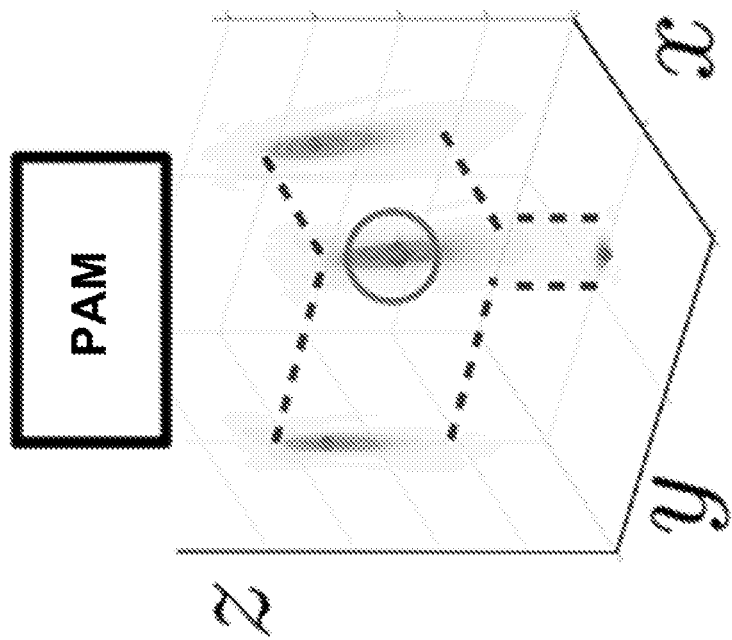
FIG. 2C

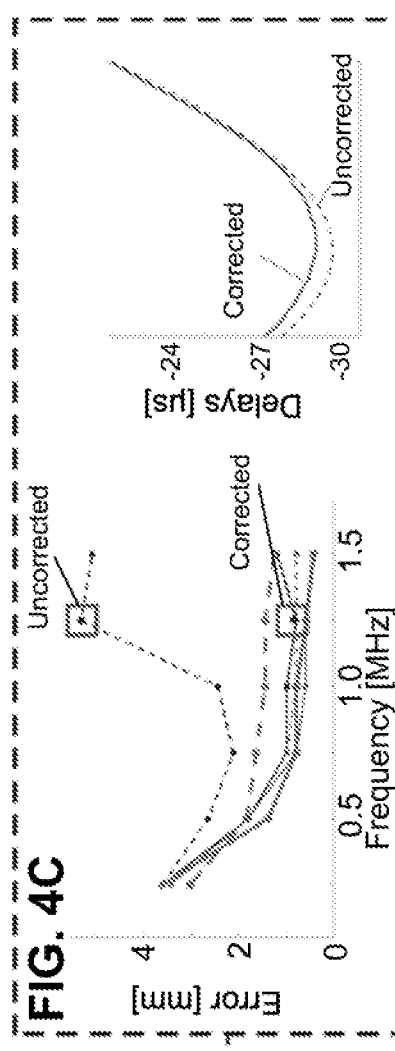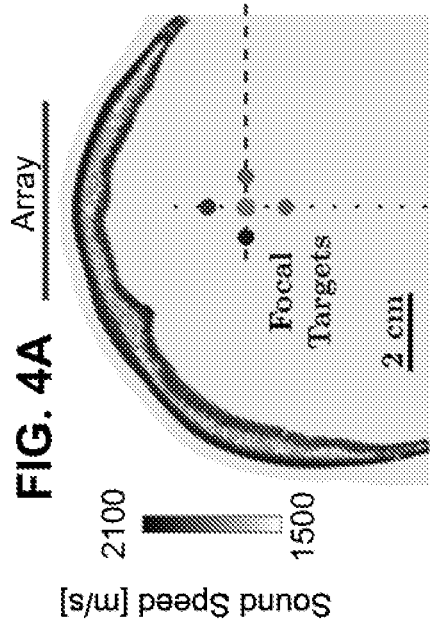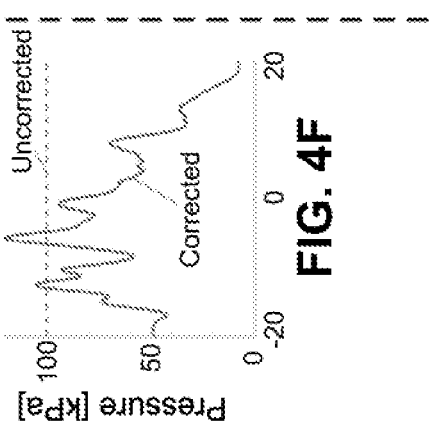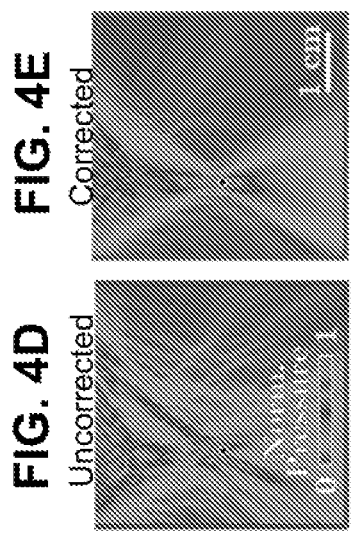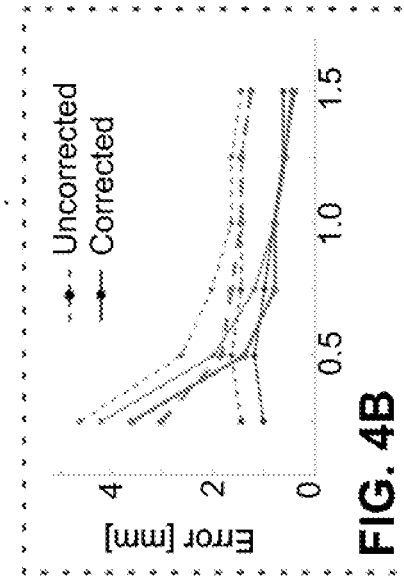
FIG. 4A FIG. 4B FIG. 4C FIG. 4D FIG. 4E FIG. 4F

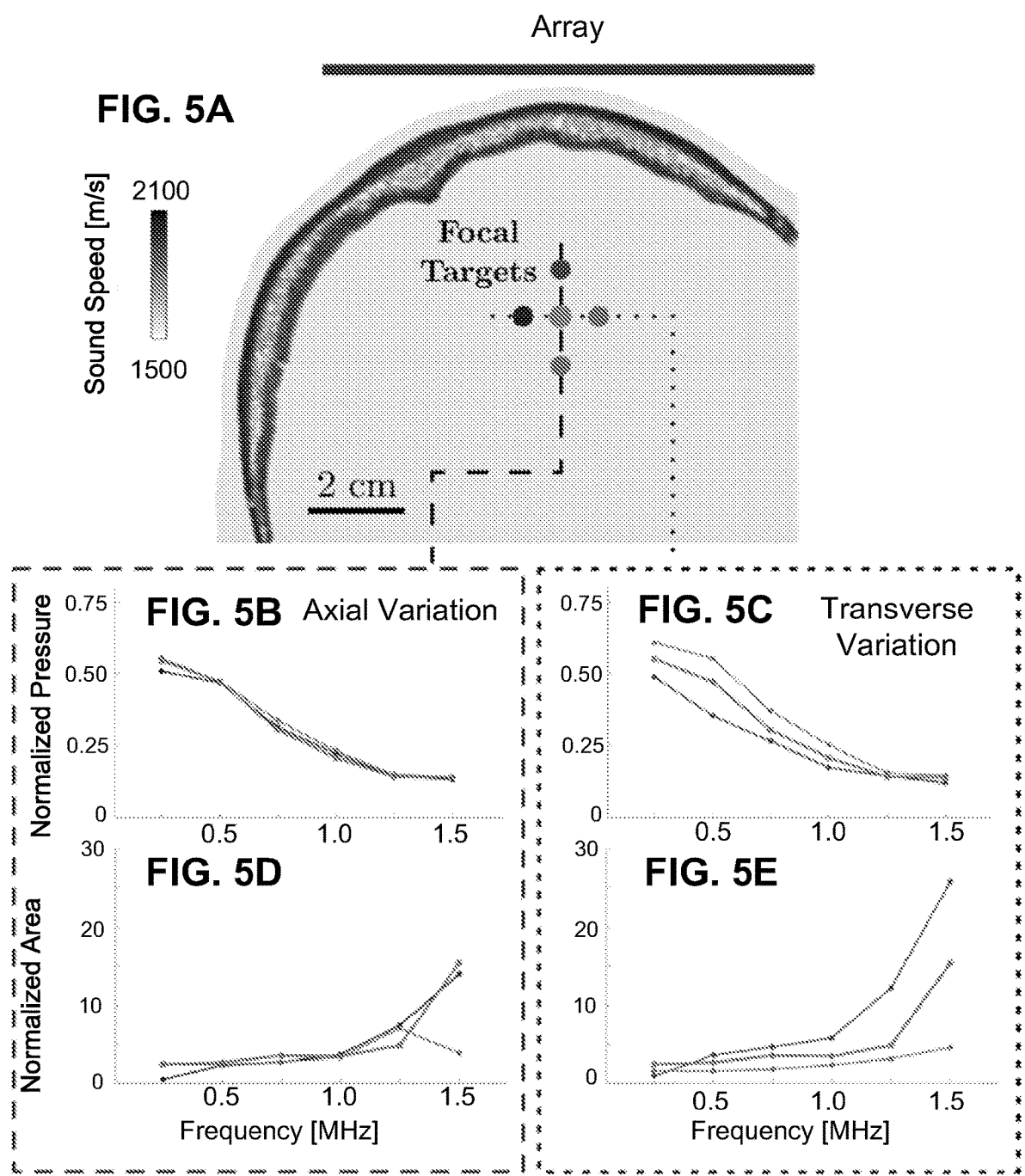

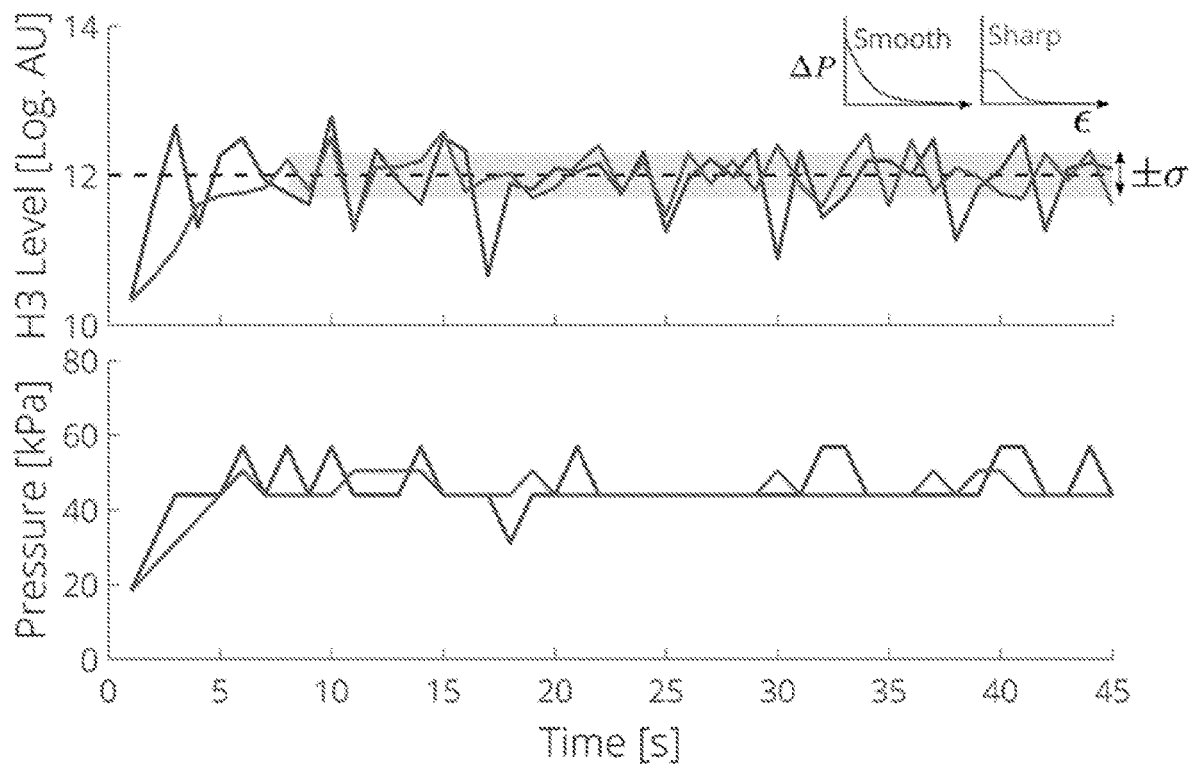
FIG. 20A
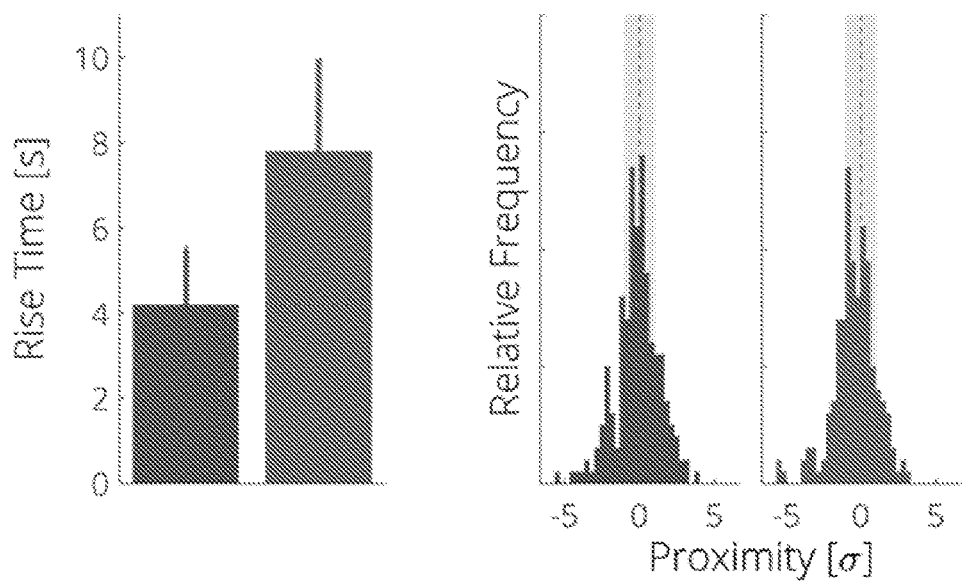
FIG. 20B  FIG. 20C

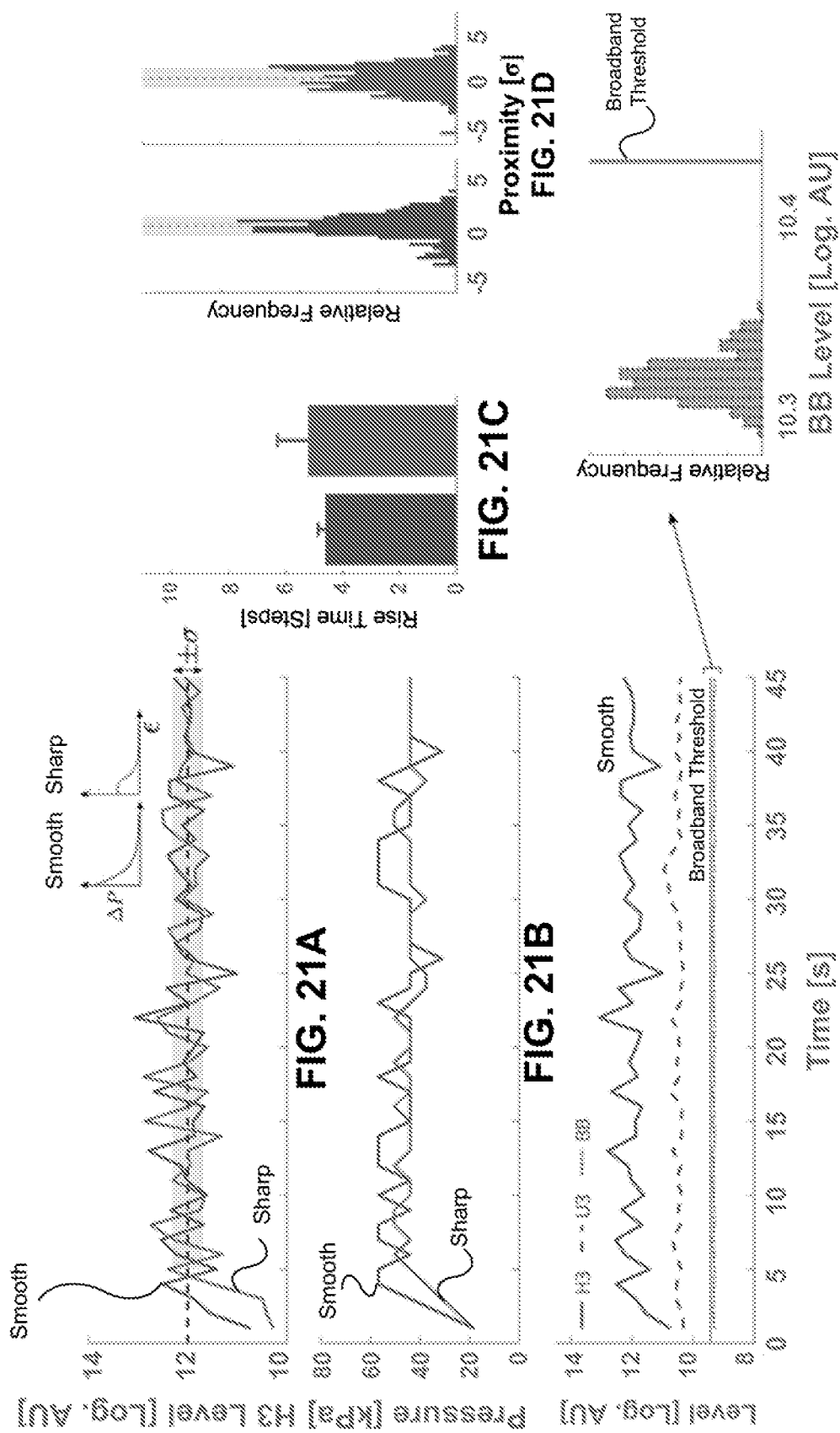

SYSTEMS AND METHODS FOR ULTRASOUND IMAGING AND FOCUSING

CROSS-REFERENCE TO RELATED APPLICATIONS

This Application claims priority, and benefit under 35 U.S.C. § 119(e), to U.S. Provisional Patent Application No. 62/758,145, filed 9 Nov. 2018, the entire contents of which is hereby incorporated by reference as if fully set forth below.

STATEMENT OF RIGHTS UNDER FEDERALLY SPONSORED RESEARCH

This invention was made with government support under Grant No. EB016971 awarded by the National Institutes of Health, and under Grant Nos. 1933158 and 1830577 awarded by the National Science Foundation. The government has certain rights in the invention.

FIELD OF THE DISCLOSURE

Embodiments of the present disclosure relate generally to systems and methods for imaging and focusing using ultrasound and, more particularly, to feedback-controlled imaging and focusing of ultrasounds.

BACKGROUND

Ultrasound has emerged as a novel modality for the treatment and imaging of many conditions, including brain diseases and disorders. When enhanced by circulating microbubble contrast agents—for example lipid, albumin, or polymer-shelled gas pockets that scatter sound and vibrate in response to incident ultrasound-ultrasound can enable a range of new therapeutic interventions and open new possibilities for imaging. Current ultrasound systems, however, are limited in both imaging and targeting.

When it comes to imaging, one limitation is the problems associated with aberrations in the media, or surface, through which the ultrasounds are passing. Ultrasound imaging of point sources within a human brain, for example, requires passing ultrasound waves through a skull, which is inherently heterogenous across its surface. One way to correct for these types of aberrations is to measure induced cavitation at a target inside the region of interest. But for treatments like brain imaging, cavitation events are not desirable, and the relatively high cavitation threshold requires additional corrections or high power arrays. Alternatively, a point source can be placed within the skull to enable effective trans-skull therapy; however, this technique requires invasive placement at the target, which is not possible.

Another limitation for ultrasound imaging relates to the fundamental limitations of diffraction associated with the finite aperture and pitch of ultrasound imaging arrays. This "diffraction limit" is about a millimeter for typical ultrasound frequencies in tissues. When ultrasound imaging is used to visualize small point sources, for example blockages in blood vessels having diameters in the order of a few hundred microns, this poor resolution is not optimal. Recent techniques to improve imaging use successive localizations of microbubbles separated in, or as a function of, time, to allow imaging of sources that would be too closely spaced (i.e., below the diffraction limit) if they were imaged simultaneously. However, one of the main challenges in these methods is the separation of the bubble signal from random motion and scattering, which can be exacerbated at low flow vessels (below 1 mm/s). Contrast harmonic imaging, where bubble localization is based on microbubble nonlinear echoes, could potentially mitigate this problem, albeit at the cost of lower frame rate and increased risk of microbubble collapse or deflation due to the need for strong nonlinearities (i.e. high SNR), which might prevent effective bubble tracking.

When it comes to targeting, or treatment, using ultrasounds, the same aberration and resolution problems described above affect ultrasound's efficacy. Another limitation is the inability of current systems to ascertain appropriate pressure levels and/or change the ultrasound's amplitude and/or frequency to match the appropriate pressure levels. Consider the example above for treating targets within a brain, such a sensitive target requires an ultrasound system to be: i) fast in order to adapt to the fast dynamics of the bubble oscillations and be amenable to clinical implementation, ii) able to account for non-modelled dynamics using feedback methods (i.e. account for the unpredictable nature of bubble dynamics), iii) robust to tuning and sensing inaccuracies, and iv) be able to accommodate broad ranges of errors and sensitivities that can be used to parameterize the control law. Some previous methods to account for these needs include open-loop controllers that lack real-time control, which hinders their ability to attain acoustic exposure level for effective cavitation activity. Previous methods with closed-loop controllers are sensitive to parameter gain tuning, bubble concentration, and do not include safety states in their design for safe execution during instabilities of the controller. Moreover, incorporation of spatial selectivity to the control of cavitation activity remains an open problem.

What is needed, therefore, are systems and methods that resolve the problems with heterogenous surfaces, improve focusing of the waves, improve image resolution beyond the diffraction limit of conventional ultrasound methods, and provide fast and adjustable feedback mechanisms to fine-tune the amplitude of ultrasound waves.

SUMMARY

Embodiments of the present disclosure address these concerns as well as other needs that will become apparent upon reading the description below in conjunction with the drawings. Briefly described, embodiments of the present disclosure relate generally to systems and methods for imaging and focusing using ultrasound and, more particularly, to feedback-controlled imaging and focusing of ultrasounds.

An exemplary embodiment of the present invention provides a method of localizing a scatterer with ultrasound waves. The method can include providing, by a transducer, a first set of ultrasound waves through a surface and to a region of interest, the first set of ultrasound waves being provided through a first section of the surface, the first set of ultrasound waves propagating through the first section of the surface at a first sound speed. The method can include providing, by the transducer, a second set of ultrasound waves through the surface and to the region of interest, the second set of ultrasound waves being provided through a second section of the surface, the second set of ultrasound waves propagating through the second section of the surface at a second sound speed, the second sound speed being different than the first sound speed. The method can include receiving, at a receiver, a first set of signals emanating from the region of interest. The method can include receiving, at the receiver, a second set of signals emanating from the region of interest. The method can include calculating an angular spectrum of the first set of signals and the second set of signals. The method can include generating a pixel intensity field with the angular spectrum. The angular spectrum can be calculated at least in part based on the first sound speed and the second sound speed.

In any of the embodiments described herein, the angular spectrum can be phase corrected based at least in part on the first sound speed and the second sound speed.

In any of the embodiments described herein, the method can include dividing the angular spectrum into a first angular spectrum and a second angular spectrum. The first angular spectrum can be calculated based at least in part on the first sound speed, and the second angular spectrum can be calculated based at least in part on the second sound speed.

In any of the embodiments described herein, the first set of signals and the second set of signals can correspond to radio frequency data associated with the scatterer.

In any of the embodiments described herein, the scatterer can be a tissue.

In any of the embodiments described herein, the scatterer can include a plurality of microbubbles.

In any of the embodiments described herein, the surface can include bone.

In any of the embodiments described herein, the method can include phase correcting the angular spectrum based at least in part on the first sound speed and the second sound speed, thereby creating a phase-corrected angular spectrum. The method can include determining, based at least in part on the phase-corrected angular spectrum, a desired pressure level and desired delay in which to provide a third set of ultrasound waves to target a point source within the region of interest. The method can include providing, by the transducer, the third set of ultrasound waves to the point source.

In any of the embodiments described herein, the first set of signals can have a plurality of frequencies. The pixel intensity field can be populated based at least in part on a desired frequency. The method can further include selecting the desired frequency from the plurality of frequencies in which to populate the pixel intensity field.

In any of the embodiments described herein, the desired frequency can be at least one of a harmonic, ultra-harmonic, sub-harmonic, or broadband frequency range for the scatterer, and the scatterer can include a plurality of microbubbles.

In any of the embodiments described herein, the method can include monotonically increasing a pressure level of the first set of ultrasound waves. The method can include determining at least one of the harmonic, ultra-harmonic, sub-harmonic, or broadband frequency range for the plurality of microbubbles by identifying a first frequency range from the first set of signals, the first frequency range corresponding to an amplitude peak in the first set of signals.

In any of the embodiments described herein, the method can include measuring a plurality of amplitudes of the first set of signals at the desired frequency. The method can include calculating a desired amplitude of the first set of signals. The method can include calculating a desired pressure to achieve the desired amplitude. The method can include providing, by the transducer, a third set of ultrasound waves through the surface and to the region of interest, the third set of ultrasound waves providing the desired pressure to the region of interest.

In any of the embodiments described herein, the angular spectrum can be divided into a first angular spectrum associated with the first set of signals and a second angular spectrum associated with the second set of signals. The first angular spectrum can be calculated based at least in part on the first sound speed. The first sound speed can be stratified. The method can further include phase correcting the first angular spectrum with an analytical correction.

Another exemplary embodiment of the present invention provides a system. The system can include a transducer configured to provide ultrasound waves. The system can include a receiver configured to receive signals produced by the ultrasound waves interacting with the scatterer. The system can include a processor. The system can include a memory in communication with the processor and storing instructions that, when executed, cause the system to perform any of the methods of localizing a scatterer with ultrasound waves described herein.

Another exemplary embodiment of the present invention provides a method of imaging using ultrasound waves and microbubbles. The method can include introducing the microbubbles into a vessel. The method can include providing, by a transducer, a first set of ultrasound waves through an outer surface of the vessel and to at least a portion of the microbubbles. The method can include receiving, at a receiver, a first set of signals corresponding to a first excitation of at least a portion of the microbubbles. The method can include calculating a first angular spectrum of the first set of signals. The method can include generating a first pixel intensity field with the first angular spectrum. The method can include isolating a first set of amplitude peaks via a first morphological reconstruction of the first set of signals. The method can include identifying a first plurality of peak locations based on the first morphological reconstruction. The method can include providing, by the transducer, a second set of ultrasound waves through the outer surface of the vessel and to at least a portion of the microbubbles. The method can include receiving, at the receiver, a second set of signals corresponding to a second excitation of at least a portion of the microbubbles. The method can include calculating a second angular spectrum of the second set of signals. The method can include generating a second pixel intensity field with the second angular spectrum. The method can include isolating a second set of amplitude peaks via a second morphological reconstruction of the second set of signals. The method can include identifying a second plurality of peak locations based on the second morphological reconstruction. The method can include superimposing the first plurality of peak locations with the second plurality of peak locations to create an image of the vessel.

In any of the embodiments described herein, the method can include connecting each peak location of the first plurality of peak locations and the second plurality of peak locations via a Euclidian minimum spanning tree. The method can include selecting a first target location from the first plurality of peak locations and the second plurality of peak locations. The method can include calculating a first vessel center location using a local linear regression for a first set of locations located at a predetermined distance from the first target location. The method can include selecting a second target location from the first plurality of peak locations and the second plurality of peak locations. The method can include calculating a second vessel center location using the local linear regression for a second set of locations at the predetermined distance from the second target location. The method can include calculating a center of the vessel based at least in part on the first vessel center location and the second vessel center location.

In any of the embodiments described herein, the method can include calculating a mean distance between (1) the first vessel center location and the first set of locations and (2) the second vessel center location and the second set of locations. The method can include estimating a diameter of the vessel based on the mean distance.

In any of the embodiments described herein, the method can include connecting each peak location of the first plurality of peak locations via a Euclidian minimum spanning tree. The method can include assigning a first time stamp for a first location of the first plurality of peak locations. The method can include connecting each peak location of the second plurality of peak locations via the Euclidian minimum spanning tree. The method can include assigning a second time stamp for a second location of the second plurality of peak locations. The method can include calculating a flow rate through the vessel based on the first time stamp, the second time stamp, and a distance between the first location and the second location.

In any of the embodiments described herein, the first set of signals can correspond to at least one of a harmonic acoustic frequency, an ultraharmonic acoustic frequency, or a sub-harmonic acoustic frequency of the microbubbles.

In any of the embodiments described herein, the method can include filtering the first pixel intensity field to create a first marker image. The method can include filtering the second pixel intensity field to create a second marker image. The first morphological reconstruction can be based at least in part on the first marker image and the first pixel intensity field, and the second morphological reconstruction can be based at least in part on the second marker image and the second pixel intensity field.

In any of the embodiments described herein, the vessel can be a human blood vessel.

Another exemplary embodiment of the present invention provides a system. The system can include a transducer configured to provide ultrasound waves. The system can include a receiver configured to receive signals produced by the ultrasound waves interacting with the scatterer. The system can include a processor. The system can include a memory in communication with the processor and storing instructions that, when executed, cause the system to perform any of the methods of imaging using ultrasound waves and microbubbles described herein.

These and other aspects of the present invention are described in the Detailed Description below and the accompanying figures. Other aspects and features of embodiments of the present invention will become apparent to those of ordinary skill in the art upon reviewing the following description of specific, exemplary embodiments of the present invention in concert with the figures. While features of the present invention may be discussed relative to certain embodiments and figures, all embodiments of the present invention can include one or more of the features discussed herein. Further, while one or more embodiments may be discussed as having certain advantageous features, one or more of such features may also be used with the various embodiments of the invention discussed herein. In similar fashion, while exemplary embodiments may be discussed below as device, system, or method embodiments, it is to be understood that such exemplary embodiments can be implemented in various devices, systems, and methods of the present invention.

BRIEF DESCRIPTION OF THE FIGURES

Reference will now be made to the accompanying figures and diagrams, which are not necessarily drawn to scale, and wherein:

FIG. 2C is an example diagram explaining reconstruction with respect to a 3D surface, according to some embodiments of the present disclosure;

FIGS. 4A-4F depict the results of using phase corrections and amplitude shading in a heterogenous medium, according to some embodiments of the present disclosure;

FIGS. 5A-5E depict the results of analyzing the normalized focal pressure and spot size achieved with the aberration correction algorithm as a function of frequency and position, according to some embodiments of the present disclosure;

FIGS. 20A-20C are graphs of the results of testing the performance of the controller with a single observer state for two representative controller shapes, smooth and sharp, according to some embodiments of the present disclosure;

FIGS. 21A-21F are graphs showing the results of experiments on the controller with an additional observer state, according to some embodiments of the present disclosure.

DETAILED DESCRIPTION

Figure 1A:
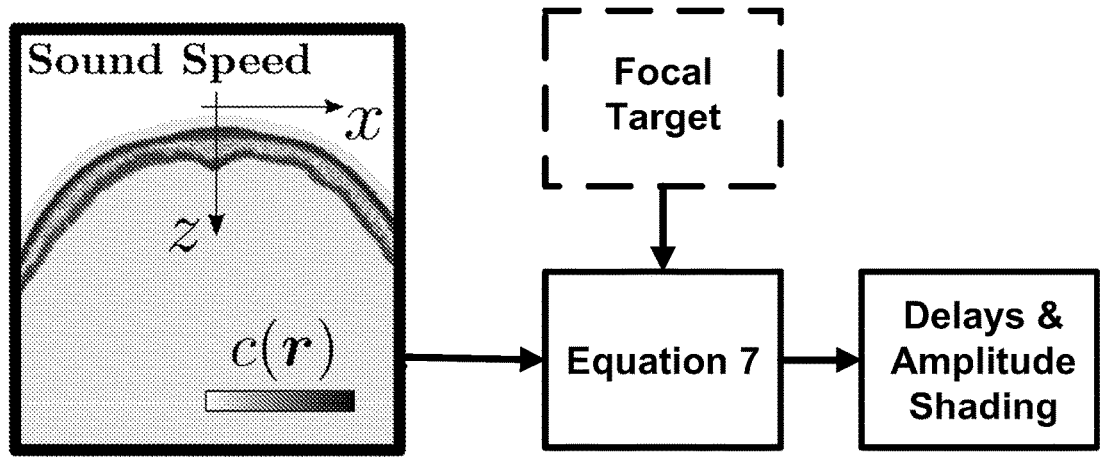
FIG. 1A is an example computational flow for focal aberration correction, according to some embodiments of the present disclosure.

Although certain embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. Other embodiments of the disclosure are capable of being practiced or carried out in various ways. Also, in describing the embodiments, specific terminology will be resorted to for the sake of clarity. It is intended that each term contemplates its broadest meaning as understood by those skilled in the art and includes all technical equivalents which operate in a similar manner to accomplish a similar purpose.

It should also be noted that, as used in the specification and the appended claims, the singular forms "a," "an," and "the" include plural references unless the context clearly dictates otherwise. References to a composition containing "a" constituent is intended to include other constituents in addition to the one named.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" may be used herein to connote different aspects of methods employed, the term should not be interpreted as implying any particular order among or between various steps herein disclosed unless and except when the order of individual steps is explicitly required.

The components described hereinafter as making up various elements of the disclosure are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter. Additionally, the components described herein may apply to any other component within the disclosure. Merely discussing a feature or component in relation to one embodiment does not preclude the feature or component from being used or associated with another embodiment.

To facilitate an understanding of the principles and features of the disclosure, various illustrative embodiments are explained below. In particular, the presently disclosed subject matter is described in the context of systems and methods for imaging and focusing using ultrasound and, more particularly, to feedback-controlled imaging and focusing of ultrasounds. In some examples, the systems and methods may be described in the context of treating patients, including human and other animal patients. The present disclosure, however, is not so limited and can be applicable in outer contexts. For example, some examples of the present disclosure may improve upon imaging and targeting in inanimate systems. The present systems and methods can be used in mining, piping, drilling, and similar processes that include using ultrasounds to visualize and target point sources. Additionally, reference is made herein to ultrasounds techniques for targeting through bone, including a human skull. It will be understood that such disclosure is illustrative, as the imaging and focusing techniques can be applied equally to other surfaces. Accordingly, when the present disclosure is described in the context of feedback-controlled imaging and focusing of ultrasounds in any particular biological setting, it will be understood that other embodiments can take the place of those referred to.

As described above, current systems and methods that use ultrasounds for imaging and targeting have inherent limitations in the feedback and resolution of the ultrasound waves. In some examples, the limitations can be in the form of focal problems associated with the heterogenous surfaces through which the ultrasounds pass. Considering for example a skull, different areas of the skull have varying thicknesses, or aberrations, and, thus, varying speed of sound waves propagating through the surface. Inherently related to the problem of errors in transcranial focused ultrasound (FUS) targeting due to skull aberrations is that of source localization. This problem has emerged as a priority in microbubble enhanced FUS therapy and imaging: when exposed to ultrasound, microbubbles scatter diverging pressure waves that, due to their size (several orders of magnitude smaller than the wavelength), act as point sources. The information carried by these waves can enable the spatiotemporal characterization of the microbubble dynamics. During therapeutic interventions, this information is used to ensure that the desired type of oscillation (i.e., stable or inertial) is taking place at the intended location (i.e. treatment monitoring).

Several approaches based on passive acoustic mapping (PAM) techniques have been proposed for monitoring the microbubble dynamics. PAM techniques create pixel intensity fields to plot the pressure distribution from scatterers like point sources or microbubbles. While early methods did not account for aberrations, recent work has been successfully incorporated human skull aberration corrections into both frequency-domain and time-domain PAM implementations. However, because these methods require either measurement (invasive) or point-by-point projections to all potential targets, they are either infeasible or time consuming (up to several minutes).

The spectral selectivity inherent to frequency domain methods can be important for characterizing the type of oscillation (e.g. harmonics vs. broadband). However current implementations do not account for aberrations. Time domain methods may incorporate these corrections and via filtering extract for certain frequency content, but these generally incur high computational loads, unless GPU units are used to speed up the computations. Reconstructions on the order of milliseconds can also be important for closed loop control of the microbubble dynamics and improved temporal resolution during microbubble imaging. Hence, fast and frequency selective reconstructions to visualize the cerebrovascular microbubble dynamics through the skull may have important implications for image guided therapy and imaging. The present systems and methods provide solutions for one or more of these needs by, for example, incorporating an angular spectrum approach (ASA) into a heterogenous medium, i.e., across a surface with aberrations.

In other examples, the limitations in ultrasound can be in the form of low imaging resolution due to the low diffraction limit of FUS imaging. Despite its unique ability to quantify vascular structure and flow, ultrasonic imaging is still hampered by fundamental limitations of diffraction associated with the finite aperture and pitch of the imaging array; this so called "diffraction limit" is on the order of a millimeter for typical ultrasound frequencies in tissue. This physical limitation, characterized by the point spread function (PSF) of the system, provides an effective lower limit on the ability of the system to resolve individual point sources. Recently, acoustic techniques have been proposed to exploit the successive localization of microbubbles—lipid-shelled gas pockets that scatter sound and vibrate in response to ultrasound waves—that are injected into the circulation. The bubbles' sizes (radii $\sim 10^{-6}$ m) are well below the diffraction limit and may therefore be treated as point sources. Termed "super-resolution" (SR) or "ultrasound localization microscopy" (ULM) techniques, these methods use successive localizations of single point source separated in, or as a function of, time to allow imaging of sources that would be too closely spaced (i.e., below the diffraction limit) if they were imaged simultaneously.

Thus, under the assumption of closely spaced but temporally separated points, the microbubble locations are reduced to single points in the image. Subsequently, the super-localization of the same or different bubbles at different times (frames) leads to an improvement in the effective spatial resolution of a composite image, which may comprise from hundreds to thousands of frames. Typically, temporal separation is achieved by high frame imaging and with bubble concentrations such that only one or several bubbles are imaged in each frame, so that their PSFs do not overlap. Due to the requirement for temporal separation of point sources, the temporal resolution of the composite image is significantly coarser than that of single B-mode images (several milliseconds). For SR imaging, the temporal resolution depends on: i) the number of frames, ii) the time required to acquire the RF (radio frequency) data or penetration depth, ii) the reconstruction time, iii) the peak extraction/estimation (i.e., bubble locations) in each frame, and iv) the final image formation and quantification. The latter might include image registration as well as estimation of vessel structure and flow, without which the SR image provides limited diagnostic information.

Existing SR techniques primarily employ active acoustic imaging (e.g., traditional B-mode or ultrafast plane wave imaging). In these methods, the (linear) signal scattered by a single bubble forms the basis for the point source localization. Several methods have been proposed so far for estimating the true location of the bubble using B-mode images. Perhaps, the most widely and robust technique is based on Gaussian fitting of the peaks of the image intensity due to the bubble sound scattering, and reduction of the PSF to a single point. Despite its advantages, in the presence of multiple bubbles in the same frame, only strong point sources meet the acceptance criteria per frame, which narrows the dynamic range and limits the number of bubbles super-localized per frame. Additional methods include center of mass calculations, time domain fitting of the RF data, singular value decomposition (SVD) of acoustic images, statistical approaches, and the use of acoustic metamaterials, which have improved the effective resolution, albeit with additional imitations.

One of the main challenges in these methods is the separation of the bubble signal from random motion and scattering; this can be exacerbated at low flow vessels (below 1 mm/s), which are also the vessels of interest for SR techniques due to their size. Contrast harmonic imaging, where bubble localization is based on microbubble nonlinear echoes, could potentially mitigate this problem, albeit at the cost of lower frame rate and increased risk of microbubble collapse or deflation due to the need for strong nonlinearities (i.e. high SNR), which might prevent effective bubble tracking. Additionally, full accounting of out of plane motion necessitates volumetric imaging, which requires extended acquisition times and added computational expense. SR methods based PAM can overcome the challenges associated with the separation of the bubble signal from random tissue motion by filtering out linear tissue scattering. By exploiting constructive interference, these methods can detect microbubble echoes that are lower than the electronic noise of the imaging system, allowing the detection of weak nonlinear microbubble oscillations. However, PAM-SR based on time domain data is prohibitively slow for imaging of a three dimensional volume.

While both passive and active methods are able to resolve vessels at an order of magnitude below the diffraction limit, currently the analysis of the vascular structure, which is important for diagnosis, is in its infancy. Likewise, methods for the estimation of microvascular velocity have received more attention only recently, with methods originally developed for transportation analysis providing the most promising approach. Formal and computationally efficient methods to analyze the SR image content could play major role in determining the lower limit on the number of points required, which is important for optimizing the acquisition time, reducing motion artifacts, and extracting diagnostically useful information.

The present systems and methods describe a spectrally resolved super-resolution ultrasound method that is able to compute the super-resolved bubble locations, trajectories, and velocities using their nonlinear echoes. The methods are based on frequency domain PAM with the ASA and morphological image processing techniques combined with Gaussian fitting for effective detection of multiple peaks with different signal intensities within the same image.

Moreover, the present disclosure describes a method for vessel reconstruction and flow estimation that is based on multidimensional connectivity of the super-resolved microbubble distribution computed with a Euclidean minimum spanning tree (EMST).

The following disclosure provides solutions to both heterogenous surfaces and the inherently low diffraction limit of FUS. The disclosure also provides a closed loop controller based on imaging parameters described above. In some examples, the controller uses fast frequency-selective PAM based on the ASA. The controller includes safety states based on the recorded broadband signal level and is able to reduce sensing inaccuracies with the inclusion of multiple frequency bands. In some embodiments, the controller can use the peak intensity of the PAMs, reconstructed using a desired excitation frequency, for example a selected harmonic like the 3rd harmonic.

As described above, the examples described herein utilize fast frequency-selective PAM based on the ASA. PAM is a mapping technique that enables the capture of acoustic emissions of scatterers (for example point sources, tissues like clots, microbubbles, and the like) originating from a region of interest without interfering with the therapy pulse. A pixel intensity field can be generated, and the peak intensities can be taken to be the point source location. The ASA is a technique that performs computations in the frequency domain, enabling reconstructions created with selected frequencies. The angular spectrum of a monochromatic ($\propto -i\omega t$) field $\tilde{p}$ with angular frequency $\omega$ is given by its spatial Fourier transform $\mathcal{F}_k [\tilde{p}(x, y, z)]$:

$$P(k_x, k_y, z) \equiv \int\int_{-\infty}^{\infty} \tilde{p}(x, y, z) e^{-i(k_x x + k_y y)} dx dy, \quad \text{Equation 1}$$

Application of the spatial transform to the homogeneous Helmholtz equation $[\nabla^2 + (\omega/c_0)^2]\tilde{p}=0$ yields an ordinary differential equation for the angular spectrum $$\frac{d^2 P}{dz^2} + k_z^2 P = 0, \quad \text{Equation 2}$$

where $k_z^2=(\omega/c_0)^2-k_x^2-k_x^2$, and $c_0$ is the small signal speed of sound. If the AS ($P_0$) at some reference plane ($z=0$) is measured, and it is assumed that there are no backward-travelling waves, then Equation 2 has the solution $$P = P_0 e^{ik_z z} \quad \text{Equation 3}$$

and the field may be reconstructed in any plane as $$\tilde{p} = \mathcal{F}_k^{-1} [P_0 e^{ik_z z}]. \quad \text{Equation 4}$$

The following description describes example methods for (1) correcting for heterogenous surfaces using the ASA-PAM technique described above, (2) using the ASA-PAM technique to create a super-resolution image, and (3) designing a controller that i) adjusts the pressure change ($\Delta P$) from the initial value ($P_0$) according to the level of the harmonic (or ultra-harmonic) signal, ii) selects the sign of the applied pressure (increase or decrease: $\pm \Delta P$) according to the level of the harmonic signal, and iii) incorporates a switch state that is based on the broadband emissions to ensure a predefined level of broadband emissions is not exceeded (i.e. safety state).

I. Extension of the Approach to Heterogenous Media

The following description applies the PAM-ASA approach described herein to heterogenous media. For example, a human skull can be a surface in which the ultrasounds pass to either image or target point sources (or targets) within a region of interest. In the case of relatively weak heterogeneity—i.e. the sound speed c(r) changes slowly across the surface compared with the wavelength—the governing equation is:

$$\frac{d^2 P}{dz^2} + k_z^2 P = \Lambda * P. \quad \text{Equation 5}$$

Here, $\Lambda = \mathcal{F}_k[k_0^2(1-\mu)]$, $k_0=\omega/c_0$, $\mu=c_0^2/c$, $c_0$ is a reference (average) sound speed, and * denotes a 2D convolution over the wavenumber components and $k_x$ and $k_y$. From Equation 2, the heterogeneity appears as a source term in the governing equation. In the general case, the implicit solution of Equation 5 may be obtained with the Green's function technique $$P = P_0 e^{ik_z z} + \frac{e^{ik_z z}}{2 i k_Z} \int_0^{z'} e^{-ik_z z'} (\Lambda * P) dz' \quad \text{Equation 6}$$

A numerical approximation of Equation 6 may be made to compute P at arbitrary z via $$P \approx P_0 e^{ik_z \Delta z} + \frac{e^{ik_z \Delta z}}{2 i k_z} (\Lambda * P) \times \Delta z \quad \text{Equation 7}$$

where $P^n = P(k_x, k_y, n\Delta z)$.

Tables 4-6 provide a list of symbols used herein. The Equations 5-7 above can be used for cases when heterogeneity is weak across the surface, for example the sound speed c(r) changes slowly compared with the wavelength. In other words, the heterogenous surface is phase corrected across a plurality of sections of the surface. In other embodiments, a first sound speed of a first section of the surface can be calculated based on the calculations in Equations 1-4, a second sound speed of a second section of the surface can be calculated based on the calculations in Equations 1-4, and a step-wise propagation can be computed at intermediate planes "z." It is also contemplated that the ASA of the surface can be averaged across all sections of the surface.

A. Example Methods for Heterogenous Media

Figure 1B:
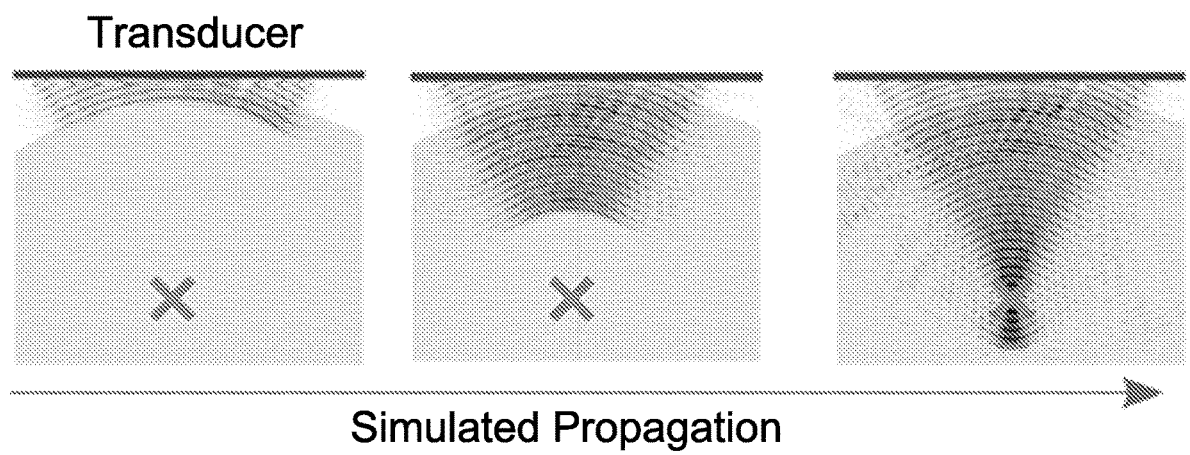
FIG. 1B depicts the process of using delays and amplitudes to simulate propagation, according to some embodiments of the present disclosure.
Figure 2A:
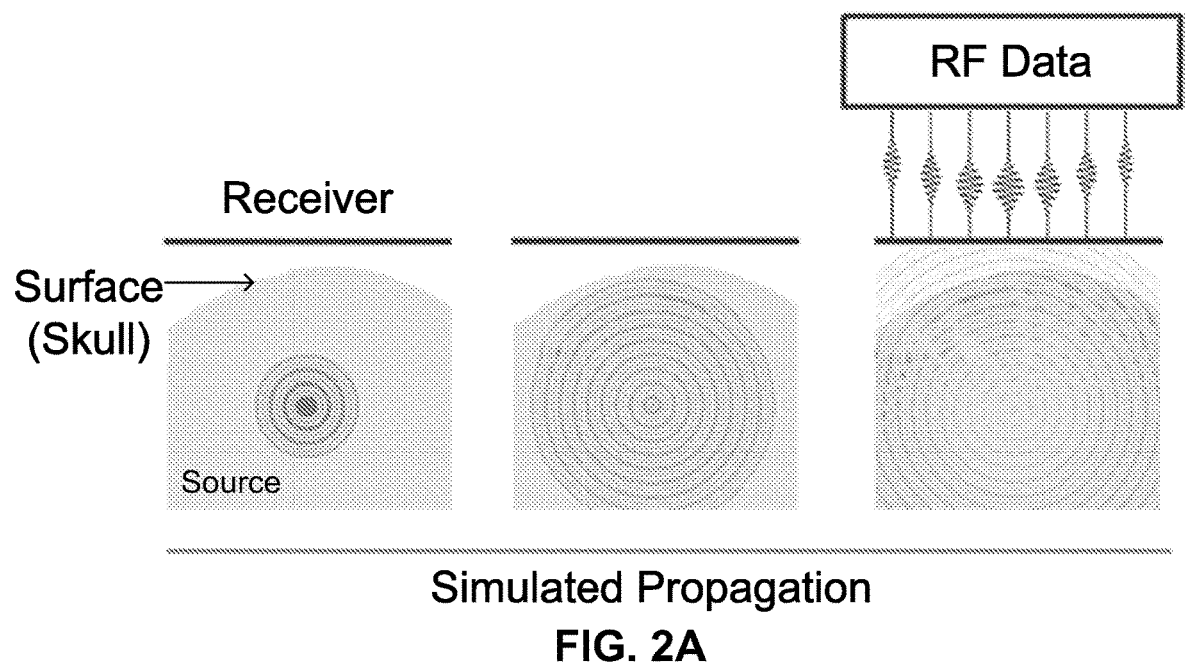
FIGS. 2A-2B are example computational flows for scatterer localization, according to some embodiments of the present disclosure.
Figure 2B:
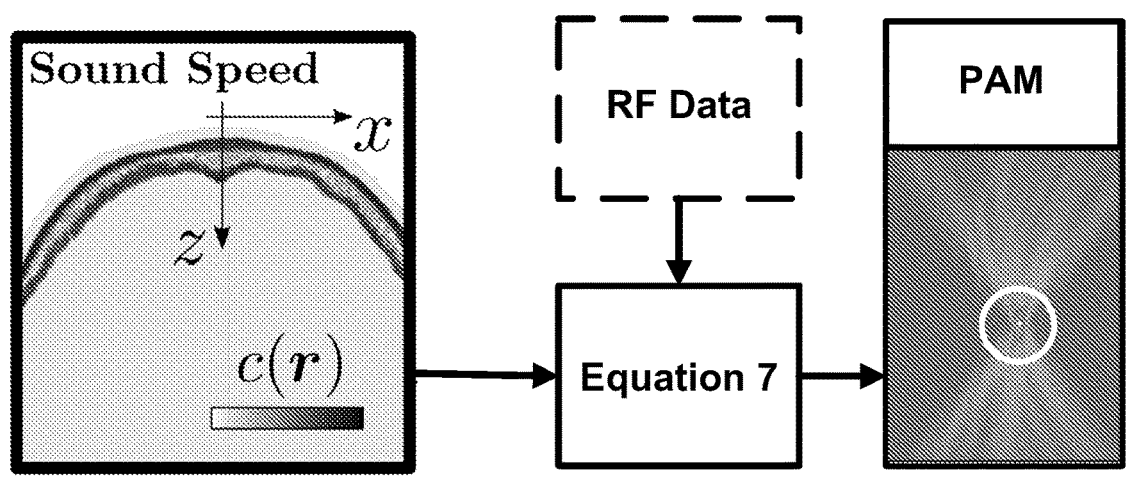

Acoustic propagation (either to evaluate the focusing achieved with the computed time delays or to acquire the RF data to be used with the corrected beamforming) was simulated in k-Wave. As the incident angles were largely below the critical angle for skull bone (~26°), elastic effects were not included in the simulation. The skull and tissue densities were computed from CT data of a human skull, and the spatially-dependent sound speed and absorption coefficient were computed from the Hounsfield scale conversion as described previously. Absorption was included via a power law model $\alpha(r)=\alpha_0 (r) \cdot f^\beta$. A power law exponent of $\beta=1.2$ was defined for the entire medium, as k-Wave's implementation does not allow spatial variation of this parameter. Spatial grid spacing μm and time step 40 ns were used for all simulations (CFL number cΔt/Δx=0.44), and 2000 time steps (800 μs) were simulated. The reference sound speed was taken to be the average value over the entire grid. All reconstruction and aberration correction scripts were written and run on a computer without parallel or graphical processing techniques. The general computational flows for focal aberration correction are shown in FIGS. 1A-1B, and general computational flows for source localization are shown in FIGS. 2A-2C. While the correction can function in 3 dimensions (e.g., FIG. 2C), due to the large number of simulations required, simulations were performed in 2D (60 mm by 80 mm, with 10 point perfectly matched layer) for computational efficiency. Thus, in the reconstructions $k_y=0$.

FIG. 1A depicts the flow of computations for focal aberration correction. The known sound speed field c(r) is used, together with the target focal spot, to compute the element amplitudes and time delays. FIG. 1B depicts the process of using the delays and amplitudes to simulate propagation, and the location of peak intensity is compared with the target point.

To assess the focal aberration correction through human skull with the ASA, as shown in FIGS. 1A-1B, the focusing delays were computed with and without phase corrections for clinically relevant frequencies (0.25-1.5 MHz). To achieve focusing at a desired depth d, $P(k_x, d)$ was computed for a delta function at the desired focus, i.e. for computed for a delta function at the desired focus, i.e., for $P_0 = \mathcal{F}_k [\delta(x-x_0, 0)]$. Since the field is monochromatic, the excess phase represents the total time delay τ for an array element as a function of its position along the transducer face $$\tau(x) = \frac{\arg \tilde{p}(x, d)}{\omega}. \quad \text{Equation 8}$$

Phase unwrapping was used to preserve the full phase of P at the transducer location. For reference, the results of focusing using the delays calculated with Equation 8 were compared with the results obtained without accounting for medium heterogeneity (i.e., geometrical focusing). In this case, the delays were computed with $c_0=1500$ m/s from $$\tau(x) = \frac{\sqrt{(x-x_0)^2 + d^2}}{c_0}. \quad \text{Equation 9}$$

To avoid very steep changes on the spatial computation grid, the delta function was approximated as a cosine-windowed Gaussian distribution with full width at half maximum of 1.5 mm.

The excitation time series for each element was then a 40-cycle sine pulse with 100 kPa amplitude at the desired frequency, modulated with a Tukey window with R=0.1, and shifted by the amount given by Equation 8 (or Equation 9 in the uncorrected case). The relative amplitude for each element was scaled according to be the normalized amplitude of $\tilde{p}(x, d)$ (or unity in the geometric case); the maximum amplitude of the corrected case was set to be 20% larger than the uncorrected case due to the tapering of the outer elements. The field was then simulated with each element of the array transmitting with the calculated phase delay and amplitude.

Referring again to FIGS. 2A-2C, the figures show the general computational flows for source localization, i.e., creating a pixel intensity field (PAM) of the source localization. FIG. 2A depicts simulating the trans-skull propagation from a source, and the RF data are collected by a virtual array. In FIG. 2B, the known sound speed field c(r) is then used with Equation 7 to reconstruct the corrected intensity fields (PAMs). The peak intensity of the PAMs (the circle in the plot) is taken to be the source position, which is compared with the known true location from the simulation. FIG. 2C shows how the reconstructions can be performed in 3D if a planar virtual array is used.

The effect of focal aberration correction for the PAM of the microbubbles, as shown in FIGS. 2A-2C, were assessed to determine the improvement of the present systems and methods on point source localization. Microbubbles were approximated as Gaussian sources center frequencies of 0.4, 0.8, and 1.2 MHz (to represent harmonic components of bubbles excited with trans-skull FUS at 200 kHz or 600 kHz). Sources (N=150) were placed randomly within a region (approximately 2 mm wide by 3 cm long) representing a vessel shape, within a sound speed environment defined from the CT data (see FIGS. 6A-6D, which are discussed in greater detail below). To determine the error as a function of position and array aperture, 1 MHz sources were then individually simulated in a rectangular grid at axial positions of 30 to 80 mm, and transverse locations from −20 to 20 mm.

The resulting pressure from these sources was measured by a virtual linear array with 200 μm pitch (e.g., 250 elements for 50 mm array). The RF data $\tilde{p}(x, 0)$ were then transformed to give $P_0$, from which $P(k_x, z)$ was computed with Equation 3 or Equation 7, as described above, with a step size Δz=50 μm. The pressure distribution was then found from $\tilde{p} = \mathcal{F}_k^{-1}[P(k_x, z)]$, and the pixel intensity field (i.e., the PAM) was computed as $I(x, y) = \|\tilde{p}(x, z)\|^2$. The convolutions in Equation 7 were computed in the frequency domain to improve efficiency, since $P * \Lambda = \mathcal{F}_k^{-1}[\tilde{p} \cdot \lambda]$. Finally, the recovered source positions were taken to be the maxima of the generated PAMs and compared with the known source positions from the simulation, described above. Because P is proportional to exp $ik_z z$, back propagation incurs multiplication by exp$-ik_z z$. Evanescent components of the angular spectrum, for which $k_z$ is pure imaginary, will then grow exponentially. Therefore, all measured angular spectra $P_0$ were windowed with a Tukey window with cosine fraction R=0.25 to taper these components. Additionally, all initial spectra were zero padded such that their computational extent was four times larger than their physical extent. Sound speed fields c(r) were padded with their edge values replicated to match the grid size of the padded $P_0$. The axial step Δz was 50 μm and the field was computed from z=0 to 90 mm.

In some examples, the ASA approach can be extended to the special case of a stratified medium. A stratified medium can include a surface that is layered but continuously changing. This can be beneficial for biological applications of the presents system and method, as numerous layers of tissue may be present between the transducer and the region of interest. This may also be beneficial for underwater acoustics or atmospheric imaging (RADAR), for example, as the properties of the surface between the transducer and the region of interest may be constantly changing. The solution to stratified media, or when the speed of sound is stratified, can include an analytical correction. For a stratified medium, Equation 7 above can be re-written as:

$$P = P_0 e^{ik_z \Delta z} \exp\left[\frac{1}{2ik_z}\int_0^z \lambda(z')dz'\right].$$ Equation 10

Expansion of the exponential term gives $$P \simeq P_0 e^{ik_z \Delta z}\left[1 + \frac{1}{2ik_z}\int_0^z \pi(z')\,dz + \cdots\right].$$ Equation 11

Retention of first order terms and approximating the integral as a left Riemann sum gives $$P^{n+1} \simeq P_0 e^{ik_z \Delta z} + \frac{e^{ik_z \Delta z}}{2ik_z}P^n \lambda(z)\Delta + O(\Delta z^2).$$ Equation 12

In the stratified medium case, $\Lambda^* P^n = \lambda P$, so that Equation 7 above agrees with Equation 12 to $O[(\Delta z)^2]$. Use of the truncated expansion in Equation 11 requires that $$\frac{1}{4}\left(\frac{k_0}{k_z}\right)^2\left[k_0\int_0^z (1-\mu)\,dz\right]^2 \ll 1.$$ Equation 13

In the par field (e.g., for PAM or focusing), the paraxial approximation dictates that first term is of order 1. Equation 13 is true if $\mu \approx 1$, i.e., for relatively weak inhomogeneity. In testing the analytical solution for stratified media, it was shown that the analytical correction can increase the efficiency of the present systems and methods in the special case of a stratified medium. For example, in experiments, the full solution described above increased the computation time to approximately 166 ms, while the analytical algorithm for stratified medium can be evaluated in about 77 ms.

Figure 3:
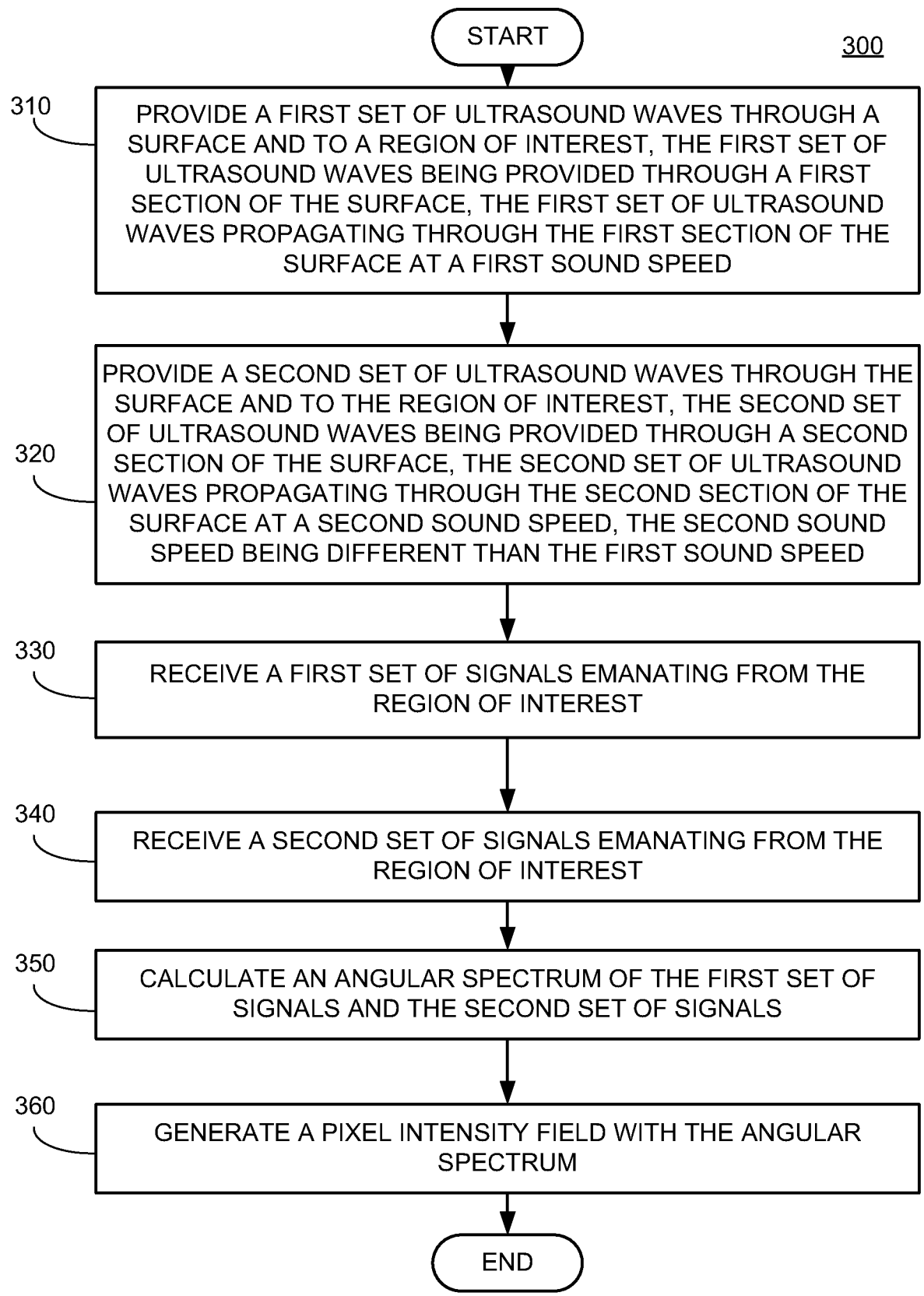
FIG. 3 is an example method of localizing a scatterer with ultrasound waves, according to some embodiments of the present disclosure.

FIG. 3 is an example method 300 of localizing a scatterer with ultrasound waves, according to some embodiments of the present disclosure. Throughout this disclosure, the term scatterer can be understood to be any point within a region of interest that can receive the ultrasound waves and then, as a result of the scatterers' excitation, disperse a set of signals corresponding to the excitation. The scatterer can include, but is not limited to, a point source within a region of interest, tissue (e.g., clots, vessels, and the like), microbubbles, and/or the like.

In step 310, method 300 includes providing, by a transducer, a first set of ultrasound waves through a surface and to a region of interest, the first set of ultrasound waves being provided through a first section of the surface, the first set of ultrasound waves propagating through the first section of the surface at a first sound speed. Descriptions of example transducers are provided herein. In step 320, method 300 includes providing, by the transducer, a second set of ultrasound waves through the surface and to the region of interest, the second set of ultrasound waves being provided through a second section of the surface, the second set of ultrasound waves propagating through the second section of the surface at a second sound speed, the second sound speed being different (e.g., slower or faster) than the first sound speed. Reference to different sections of the surface, for example the first and second sections, can be understood to mean that the first section is at any distance from the second section such that the first section and the second section have different sound speeds. The different sections are within the same surface (for example the different sections may both be on a single human skull). The first section may be separated from the second section be mere millimeters or less, but the different sections at least have different sound speeds.

In block 330, method 300 includes receiving, at a receiver, a first set of signals emanating from the region of interest (e.g., ultrasound waves can "bounce-back" from the region of interest). Descriptions of example receivers are provided herein. The first set of signals can, for example, be RF signals from the scatterer. In block 340, method 300 includes receiving, at the receiver, a second set of signals emanating from the region of interest. Again, the second set of signals can, for example, be RF signals produced by the scatterer. In block 350, method 300 includes calculating an angular spectrum of the first set of signals and the second set of signals. The angular spectrum can be calculated, for example, by utilizing Equations 1-4 above and Equation 7 for heterogenous media. The angular spectrum can be calculated at least in part based on the first sound speed and the second sound speed. In block 360, method 300 includes generating a pixel intensity field with the angular spectrum, such as the PAMs described herein.

In some examples, method 300 can end after block 300. In other examples, additional steps can be performed according the examples described herein. In some examples, the angular spectrum can be phase corrected, for example, by using Equation 7 described above. In other examples, the angular spectrum can be divided into two angular spectrum analyses, where a first angular spectrum is calculated according to Equations 1-4 above and a second angular spectrum can be calculated according to the same equations. A step-wise propagation can be computed at intermediate planes "z." The surface can be any surface, including tissue (e.g., vessels, bone, etc.) or non-biological surfaces.

B. Example Results for Heterogenous Media

The following results describe the effect of the present systems and methods on both focal aberration correction in treatment and the effect of the present systems and methods on PAM, i.e., in imaging. As for focal aberration correction, the effect of the phase correction on focal accuracy for various focal targets as a function of frequency were estimated. FIGS. 4A-4F depict the results of using phase corrections and amplitude shading using the methods described above (e.g., the embodiments shown in FIGS. 1A-1B). FIG. 4A depicts the geometry of the simulation. FIG. 4B is a graph depicting the axial focal targets, and error in the position of the maximum simulated pressure compared with the target focus point with (solid lines) and without (dashed lines) the phase and amplitude corrections are shown in the graph. FIG. 4C is a similar graph to that shown in FIG. 4B but depicts the transverse focal targets, again with phase and amplitude correction (solid lines) and without (dashed lines). For the outlying case shown in FIG. 4C (at 1.25 MHz), FIG. 4D shows the uncorrected and FIG. 4E shows the corrected maximum pressure distributions (normalized to their respective maxima). FIG. 4F shows the phase corrected and uncorrected time delays and amplitude shadings used to compute the distributions in FIGS. 4D and 4E.

For each target focus, the focal delays were computed geometrically with Equation 9 and then with corrections given by Equations 7 and 8. Across all focal positions and frequencies, the focal error was reduced from 2.1±1.2 mm without phase corrections to 1.3±1.0 mm with the correction. Aberration errors in focal targeting were generally larger at off-axis focal positions; for example, in FIGS. 4C-4E, the uncorrected focal error was 5.1 mm, while the error for the corrected case was 0.6 mm. The impact of the standoff distance of the array from the skull on focusing were also evaluated. Results indicate that the focal accuracy and improvement were comparable for different standoff distances (0.6±0.3 mm with the correction and 1.6±1.3 mm without).

The normalized (to free field) focal pressure and spot size (i.e., the total area within 3 dB of the peak pressure) achieved with the aberration correction algorithm as a function of frequency and position were also assessed. FIG. 5A depicts the geometry of the simulation. FIGS. 5B-5E comprises graphs that depict the axial (FIG. 5B) and transverse (FIG. 5C) variation in peak pressure amplitude as a function of frequency, normalized to amplitude obtained in simulations in water. The graphs also depict the axial (FIG. 5D) and transverse (FIG. 5E) focal area (3 dB) normalized to the spot size obtained in the simulated water case. The decrease in maximum pressure with frequency that is observed (FIGS. 5B-5C) reflects absorption losses that increase as $f^\beta$ ($\beta$=1.2 was used). The area of the focal region in the corrected case did increase relative to the respective water case; however, its absolute size trended downward with frequency from 22.9±13.8 mm$^2$ for 250 kHz to 6.5±3.7 mm$^2$ for the 1.5 MHz case. Both the spot size and focal pressure were seen to vary more with the focus' transverse position than with its axial position (compare FIGS. 5B and 5D with FIGS. 5C and 5E). Table 1 shows the mean and standard deviation focal location error and spot size with uncorrected (Equation 8 above) and corrected (Equation 9 above) focusing delays, averaged over all frequencies and positions shown in FIGS. 4A-5E. Together, these data demonstrate that the proposed methods are able to correct skull aberrations and improve focal targeting through the human skull.

TABLE 1

| | Uncorrected | | Corrected | |
|---|---|---|---|---|
| Aperture | Error [mm] | Size [mm$^2$] | Error [mm] | Size [mm$^2$] |
| 50 mm | 2.1 ± 1.2 | 6.8 ± 5.7 | 1.3 ± 1.0 | 12.6 ± 16.9 |
| 100 mm | 2.2 ± 0.7 | 7.5 ± 6.4 | 1.0 ± 0.4 | 9.6 ± 10.9 |

Figure 6B:
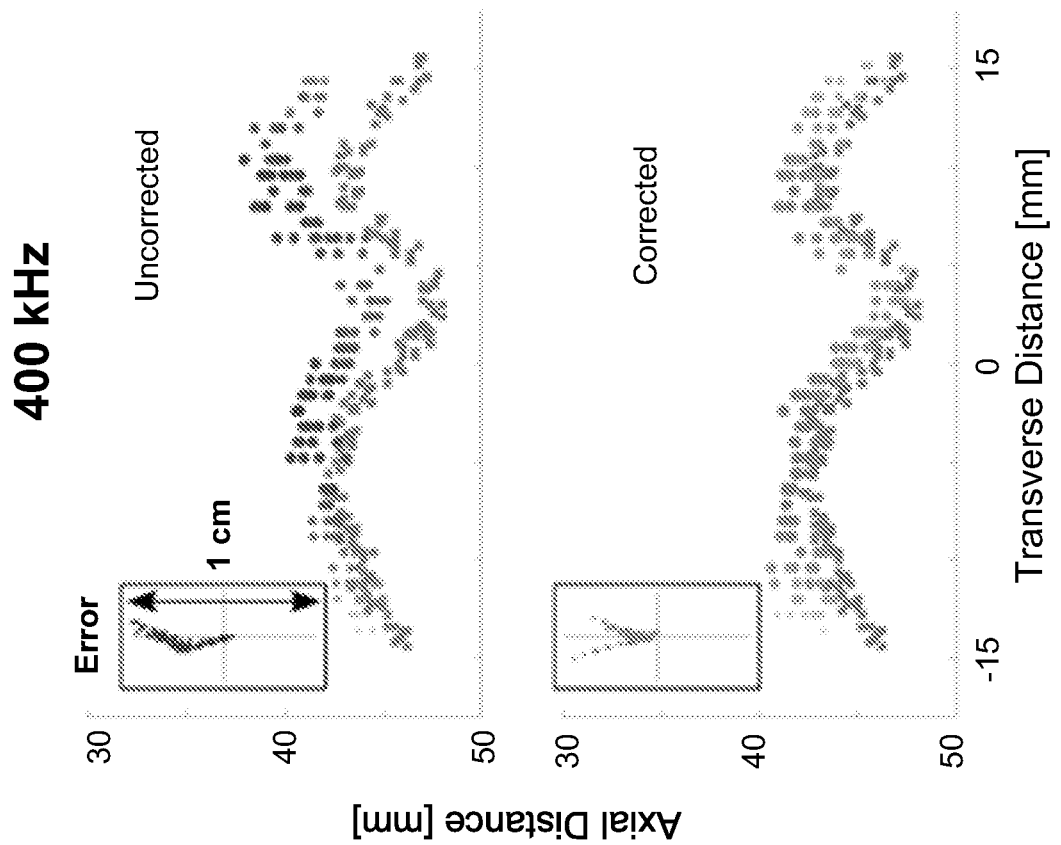
FIGS. 6A-6D depict the accuracy of source localization for uncorrected and phase corrected trans-skull ASA-PAM reconstructions, according to some embodiments of the present disclosure.
Figure 6A:
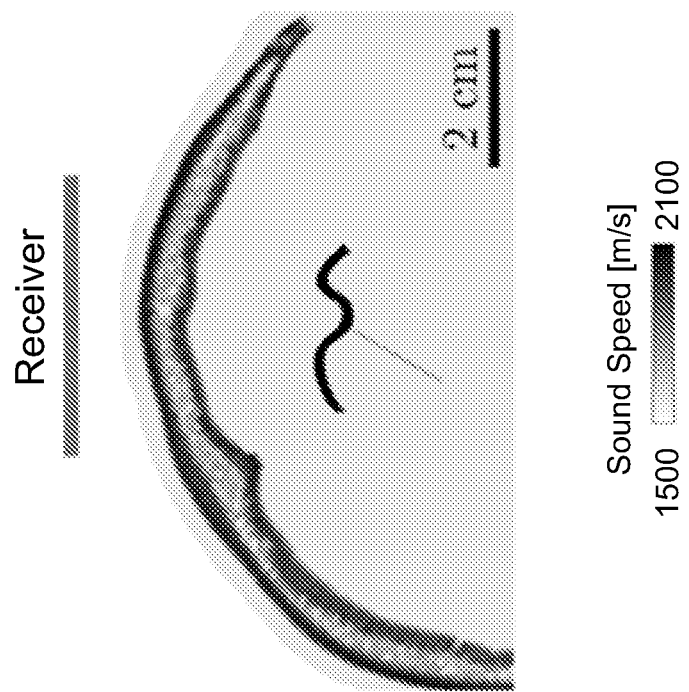
Figures 6C, 6D:
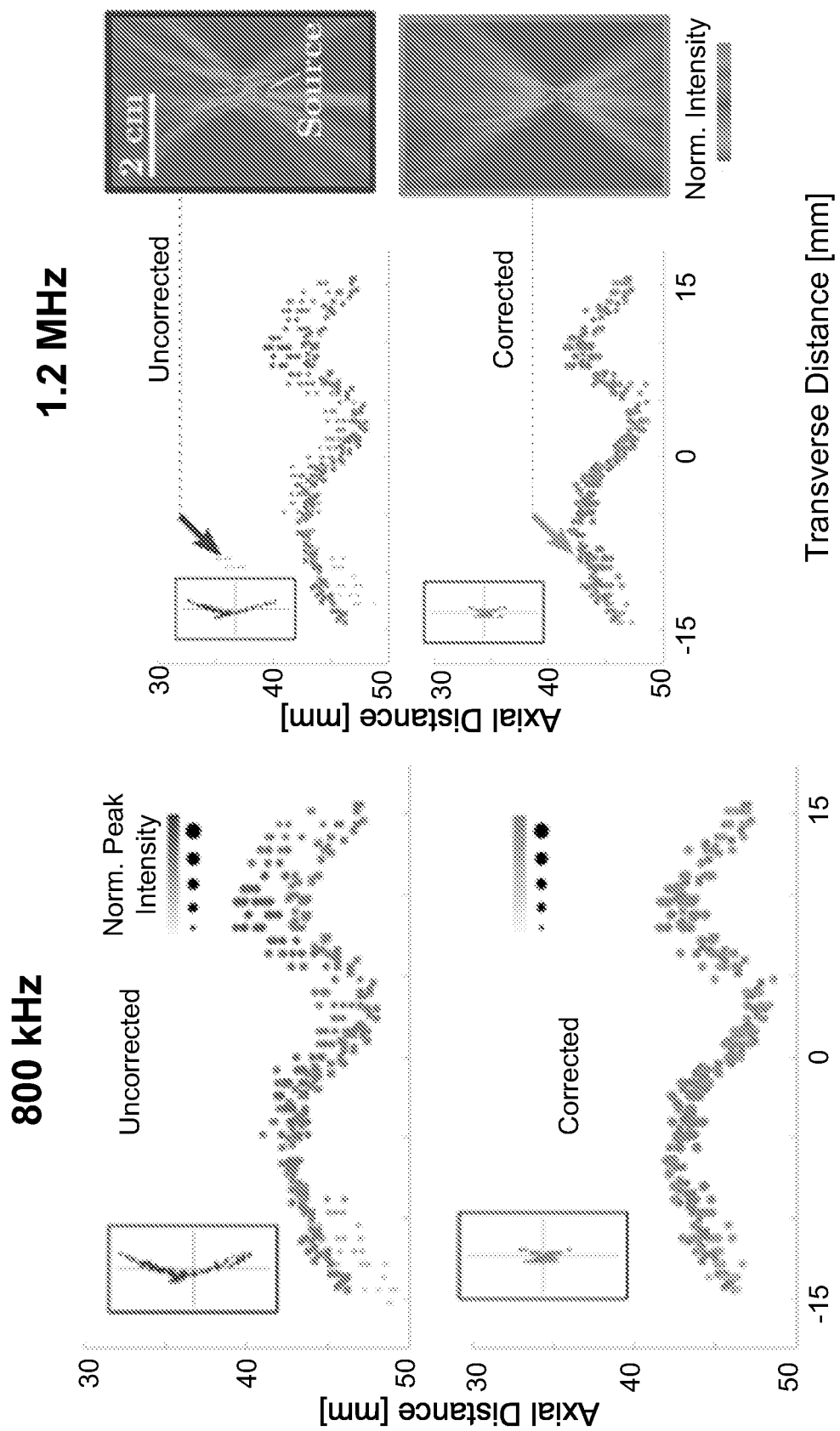

The following results describe the ability of the present systems and methods to create the pixel intensity fields (the PAM), or in other words, the ability to decrease error in source localization in the resulting image. FIGS. 6A-6D depict the accuracy of source localization for uncorrected (Equation 3 above) and phase corrected (Equation 7 above) trans-skull ASA-PAM reconstructions. FIG. 6A depicts the geometry of the receiver and region in which sources were randomly placed. In FIGS. 6B-6D, the squares represent true source positions, and the circles indicate recovered location. The size and opacity of each circle indicates the intensity of the peak in the PAM, normalized to the maximum intensity for all peaks at that frequency. The insets plot each recovered source position relative to its truth position and represent the distribution of axial and transverse errors over all reconstructions for that frequency. Peaks from PAMs were computed with unmodified algorithm (Equation 3 above) and corrected algorithm (Equation 7 above) for f=400 kHz (FIG. 6B), f=800 kHz (FIG. 6C), and f=1.2 MHz (FIG. 6D). In FIG. 6D, the normalized PAMs for the sources indicated by the arrows are shown for comparison with the true source position (dot in PAM). Aperture for all simulations was 50 mm.

The total (radial) error using the heterogenous ASA was reduced compared to that for the PAMs based on the homogeneous ASA. Specifically, using Equation 7, the localization errors were 1.6±0.9 mm, 0.6±0.4 mm, and 0.6±0.5 mm for 400 kHz, 800 kHz, and 1.2 MHz sources, respectively, compared to 2.8±1.5 mm, 2.0±1.1 mm, and 2.2±1.8 mm when Equation 3 was used (i.e., when the presence of the skull was not accounted for). Importantly, there were no outliers (e.g., in FIG. 6D, where the PAMs for the indicated sources are shown at right).

Next the localization accuracy as a function of frequency was assessed. For the present systems and methods, localization accuracy increases with frequency. Further, the intensities of the peaks in the reconstructions in the results were larger and more uniform in the corrected case overall: normalized to the mean corrected peak intensity for each case, the uncorrected PAMs had peak intensities of 0.94±0.09, 0.78±0.12, and 0.59±0.14 for the 400 kHz, 800 kHz, and 1.2 MHz, cases respectively.

Figures 7A, 7B, 7C:
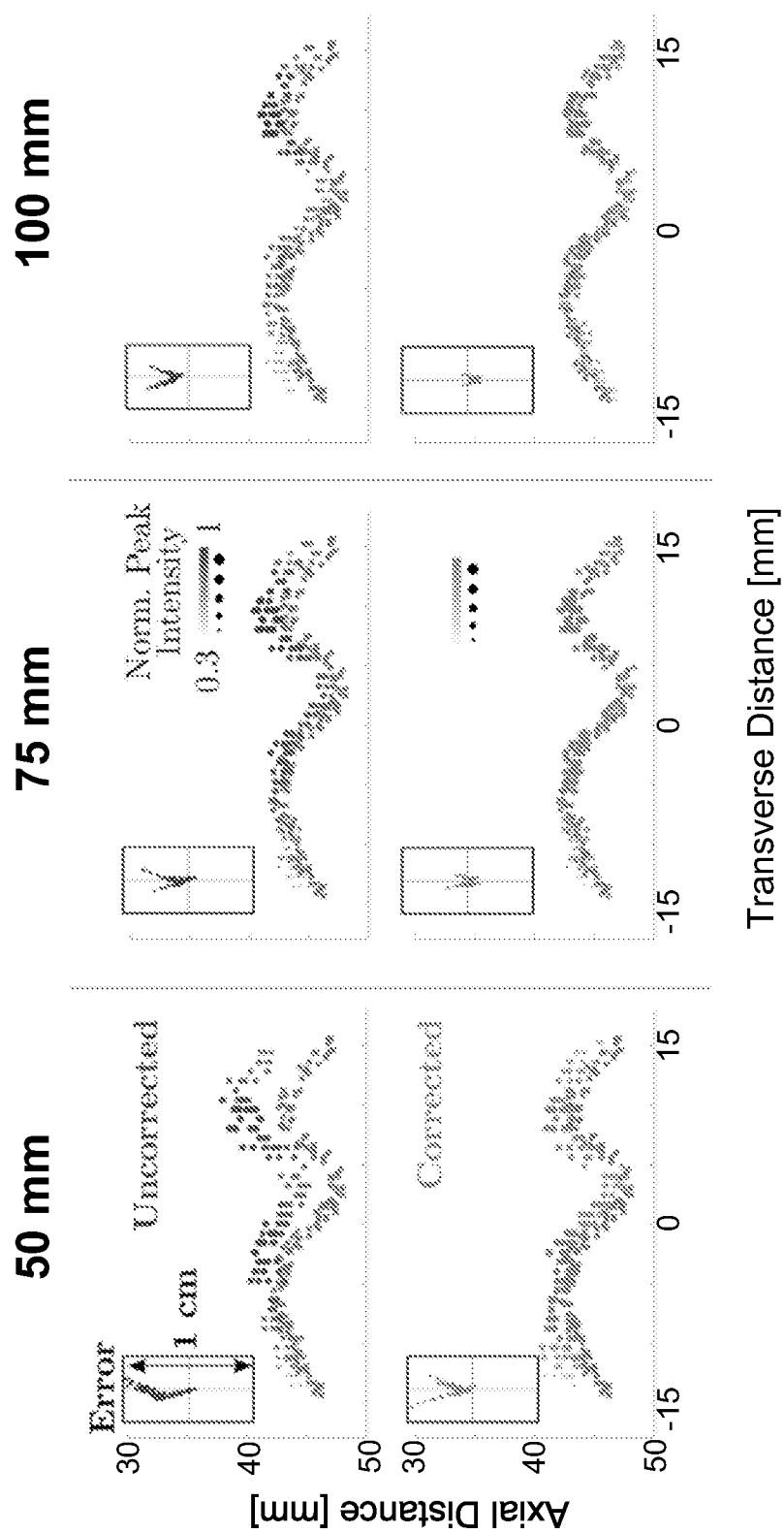
FIGS. 7A-7C are graphs showing the results of phase correcting trans-skull ASA-PAM reconstructions on source localization accuracy and intensity, according to some embodiments of the present disclosure.

For larger apertures, the localization is further improved for the corrected case. FIGS. 7A-7C are graphs depicting how phase corrected trans-skull ASA-PAM reconstructions yield improved source localization accuracy and intensity compared to the uncorrected case. The size and opacity of each circle indicates the intensity of the peak in the PAM, normalized to the maximum intensity for all peaks at that frequency. The insets plot each recovered source position relative to its truth position and represent the distribution of axial and transverse errors over all reconstructions for that frequency. Peaks from PAMs computed with unmodified algorithm (Equation 3 above) and corrected algorithm (Equation 7 above) are shown for apertures of 50 mm (FIG. 7A), 75 mm (FIG. 7B), and 100 mm (FIG. 7C). The frequency of all simulations sources was 400 kHz.

As can be seen in FIGS. 7A-7C, for the corrected case, the localization error decreases with increasing aperture size (1.5±0:9 mm, 0.4±0.3 mm, and 0.5±0.2 mm for 50 mm, 75 mm, and 100 mm apertures, respectively). For the uncorrected case, a larger aperture does not reduce the error (2.7±1.6 mm, 1.2±0.8 mm, and 1.5±0.6 mm for 50 mm, 75 mm, and 100 mm apertures, respectively).

Finally, the localization error as a function of position and aperture using a rectangular grid of 1 MHz sources within the skull was estimated. The localization error reduced by 60-80%, and the localization error in the corrected positions decreased monotonically with aperture for the phase corrected case. Further, the peak intensity in the uncorrected case was on average 30-40% smaller than in the corrected case. Table 2 summarizes the mean and standard deviation of the PAM localization error and peak intensities with uncorrected (Equation 3 above) and corrected (Equation 6 above) beamforming.

TABLE 2

| | Uncorrected | | Corrected | |
|---|---|---|---|---|
| Aperture | Error [mm] | Intensity | Error [mm] | Intensity |
| 50 mm | 3.7 ± 2.2 | 0.73 ± 0.46 | 1.2 ± 0.7 | 1.0 ± 0.60 |
| 75 mm | 2.5 ± 1.7 | 0.66 ± 0.36 | 0.9 ± 0.5 | 1.0 ± 0.47 |
| 100 mm | 3.5 ± 1.9 | 0.62 ± 0.28 | 0.8 ± 0.4 | 1.0 ± 0.39 |

For focal aberration correction, calculation of the focusing delays and amplitudes from Equations 7 and 8 above required 25.2±8.5 ms. Note that registration of the 2D sound speed map with the computational grid required 1.63±0.03 s, but only needs to be done once during registration. For PAM, the correction using the heterogeneous ASA (Equation 7), the reconstructions took approximately 166±37 ms, for a step size $\Delta z=50$ μm over all calculations. This is approximately four times slower than the homogeneous ASA (i.e., with Equation 3) where the computation of the PAMs required approximately 44±4 ms per frequency. For a 3D PAM example case, 540±18 ms was required per frequency to evaluate Equation 7 for data from a 24-by-24 element array and 100 μm step size (173 376 voxels).

The systems and methods described above provide accurate trans-skull focusing that by phase-correcting for heterogeneity of the surface of the skill. The systems and methods also provide an average of 75% error reduction and 40-60% increase in peak intensity when used for source localization in PAM imaging. Compared with previously proposed methods for adaptation of ASA to heterogeneous media, the present method has the advantage of requiring a single propagation step and does not require transformations between each axial position. Its inherent efficiency enables its use in conjunction with real-time control methods based on PAM that allow for location-specific cavitation control. Moreover, the proposed algorithm is faster than full simulation methods for phase correction (e.g., 166 ms, compared with 2 minutes for the corresponding 2D k-Wave simulation). Three dimensional heterogeneous PAM examples required 520 ms per frequency for $1.7\times 10^5$ voxels, which is comparable to GPU-optimized using high performance computers, homogeneous time domain algorithms (e.g., 3 ms for $10^3$ voxels).

II. Super-Resolution Imaging Using the ASA-PAM Approach

As described above, the ASA-PAM technique described herein can be extended to create a super-resolution image below the diffraction limit of typical ultrasound frequencies in tissue. This 1-mm diffraction limit is not optimal for imaging many important targets in the medical setting, for example, as human blood vessels can be on the order of a few hundred microns or less. The present disclosure provides a spectrally resolved super-resolution ultrasound method for quantifying microvasculature's characteristics. The systems and methods can have three key features: first, they can provide frequency selectivity to enable the detection of microbubbles' nonlinear echoes with respect to mostly linear tissue. Second, due to the extensive use of 1D/2D fast Fourier transform (FFT), computational expense can scale favorably at higher imaging depths and dimensions (3D/4D). Third, by combining a morphological reconstruction with deconvolution methods after beamforming, multiple microbubbles with different signal-to-noise ratios can be super-localized concurrently. As will be appreciated, morphological reconstruction is an image processing technique that includes two images, the first being a mask image and the second being a marker image. The reconstruction comes from repeated dilation of the marker image until the marker image fits under the mask image. Some commercial computing programs are capable of completing morphological reconstruction using the marker and mask images. In addition to the described embodiment with the ASA methods, the morphological reconstruction can also be applied to traditional B-mode and pulse inversion techniques for microbubble imaging.

The following description describes one process of imaging and characterizing microvessels, which is in accordance with some embodiments. As described above, however, the present systems and methods can be used to image and characterize other vessels, including but not limited to piping, tubing, and the like. Characterization of microvessels can include two phases: (1) super-localization of microbubbles within a vessel using their nonlinear echoes, and (2) processing the resulting points to infer vessel characteristics. For the first phase, the ASA approach to form PAMs, as described herein, can be completed, and imaging processing techniques can be used to extract peak (e.g., amplitude peak) locations. Localization of many bubbles over a period of time can provide a composite point cloud of bubble locations. To characterize the vessel, local projection aided by the Euclidean minimum spanning tree (EMST) can be used to identify vessel structure and estimate its width. Finally, use of the frame rate and extension of the EMST to include the temporal dimension can enable bubble tracing and flow estimation within the vessel.

A. Example Methods for Super-Resolution Imaging

In some examples, super-resolution imaging methods describe herein can utilize the ASA methods presented above. However, it is contemplated that other techniques can be employed to create super-resolution images using morphological reconstruction, for example standard B-mode or pulse inversion techniques.

To create a spatial mapping of the acoustic energy from the microbubbles, collected from RF data received from the target site, the ASA-PAM method described above can be used. The angular spectrum of a monochromatic ($\propto -i\omega t$) field $\tilde{p}$ with angular frequency $\omega$ is given by its spatial Fourier transform provided above in Equation 1. Application of the spatial transform to the homogeneous Helmholtz equation $[\nabla^2+(\omega/c_0)^2]\tilde{p}=0$ yields an ordinary differential equation for the angular spectrum shown in Equation 2. If the ASA ($P_0$) at some reference plane (z=0) is measured, and it is assumed that there are no backward-travelling waves, then Equation 2 has the solution in Equation 3, and the field may be reconstructed as in Equation 4. The PAM can then be formed from the total intensity amplitude $I=\|\tilde{p}\|^2$. Equation 4 may be used at an arbitrary frequency.

i. Super-Resolution of Microbubbles

Figure 8:
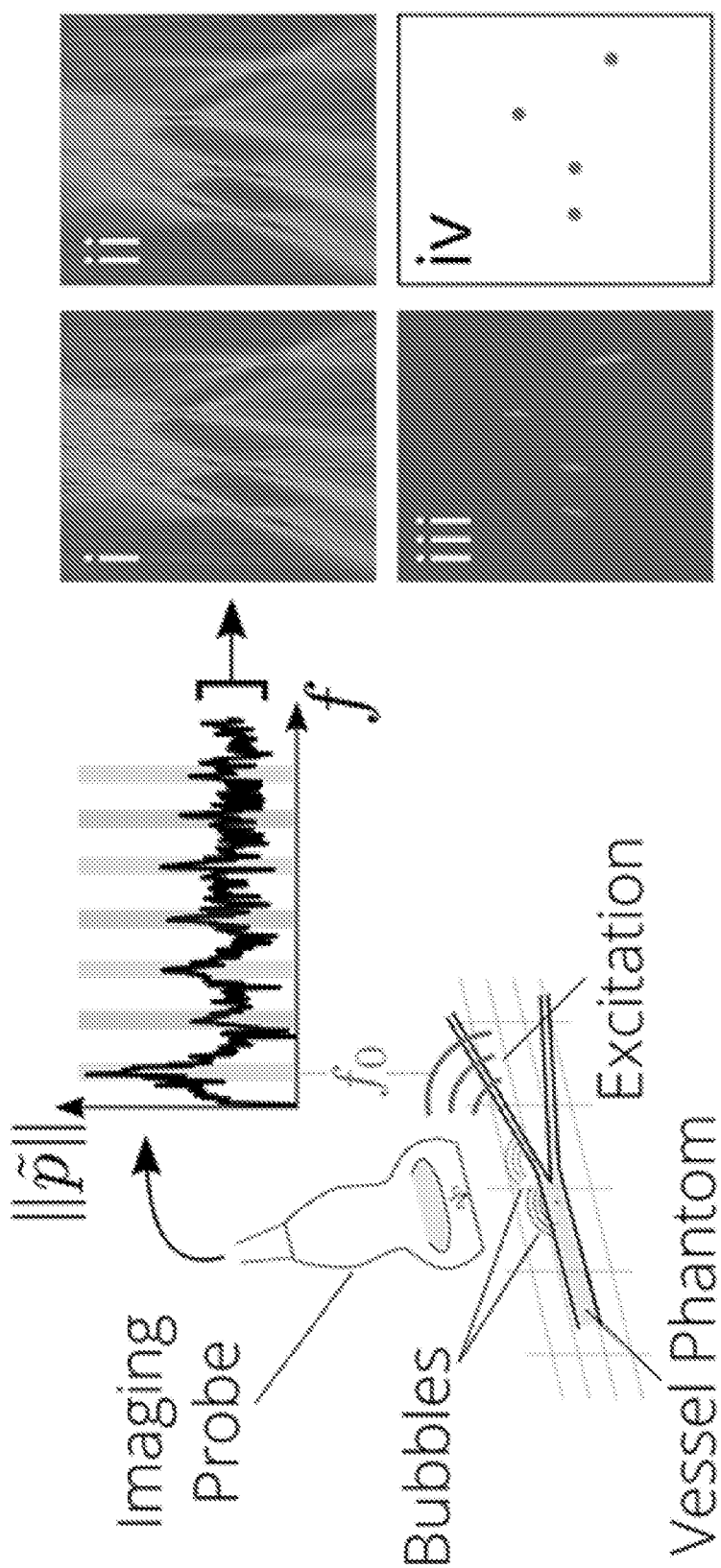
FIG. 8 is an exemplary system for super-resolution ultrasound showing example PAMs created by the system, according to some embodiments of the present disclosure.

FIG. 8 is an exemplary system for spectrally resolved super-resolution ultrasound showing example PAMs created by the system, according to some embodiments of the present disclosure. Microbubbles in a vessel phantom are excited with an ultrasonic wave at the fundamental frequency ($f_0$) and their acoustic emissions at harmonic and ultraharmonic frequencies are recorded by a linear array. While the sources are identifiable on the raw PAMs (see for example the PAM marked "i"), the areas of peak intensities have spatial extents that are on the order of millimeters. Mapping of vessels that are tens to few hundreds of micrometers requires significantly more localization specificity. To obtain an improved estimate of the bubble locations and enable localization of multiple bubbles per frame, the maps formed with ASA-PAM (image "i") can be processed with the following steps.

First, to ensure the intensity varies smoothly, the maps can be smoothed with a 2D Gaussian filter (image "ii") with standard deviations of 300 μm in each direction. Next, peak regions can be isolated: the smoothed map can be multiplied by a factor (1−h) where h ~0.5, to obtain marker image, and the original map can be used as the mask image. The value of h depends on the data; low noise data permits a smaller threshold and effectively higher sensitivity, which enables more bubble peaks to be found in each PAM.

Next, a morphological reconstruction can be performed with the marker and mask images, and the result can be subtracted from the original smoothed map to segment the image into peak regions (as shown in image "iii"). Next, to find the bubble location within each segmented region, the orientation of each region can be computed, and a local 2D convolution of the region can be performed with a Gaussian approximation of the observed point spread function at the specific location (e.g., standard deviations of 3 mm axial and 300 μm transverse) and with that orientation. The peak of each of these convolutions can be taken as the super-resolved bubble location (as shown in image "iv"). Since computation of the region orientations can be significantly less efficient in the three-dimensional case, the centroid of the peak regions can be taken to be the bubble location. In some examples, only peaks that are in the axial region of interest (for example 20 to 35 mm from the array) can be treated as true bubble locations.

ii. Vasal Reconstruction Using the Super-Resolved Bubble Locations

Figure 9:
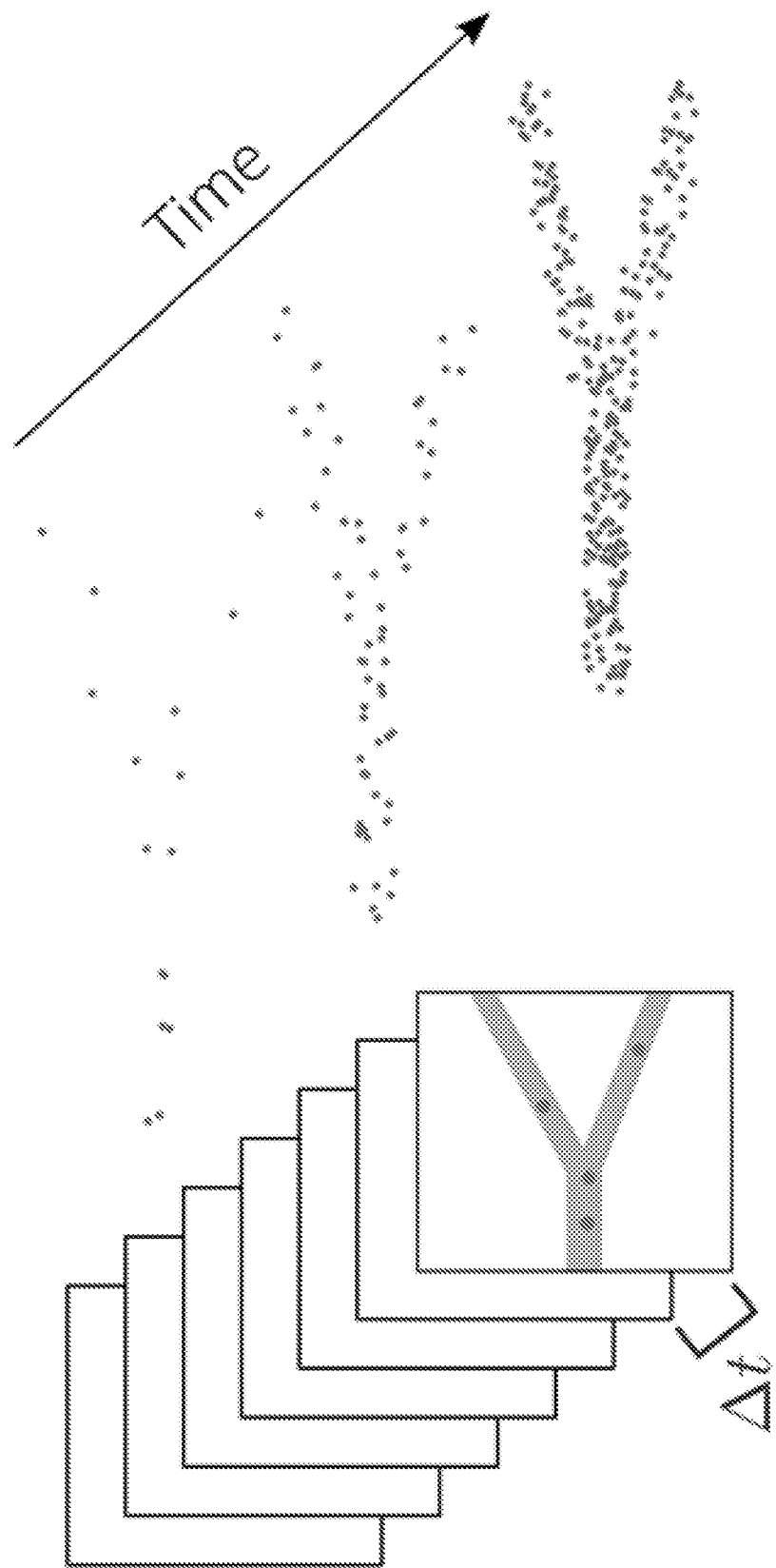
FIG. 9 is a point cloud diagram showing the use of numerous bubble-point locations to reconstruct the vessel shape, according to some embodiments of the present disclosure.

Once many super-resolved bubble locations are obtained, they will yield a point cloud, for example with the system described above in reference to FIG. 8, the locations will yield a point cloud that will resemble the vessel's shape and thickness (i.e. structure) at the resolution below the diffraction limit. FIG. 9 is a point cloud diagram showing the use of numerous bubble-point locations to reconstruct the vessel shape.

Figure 10:
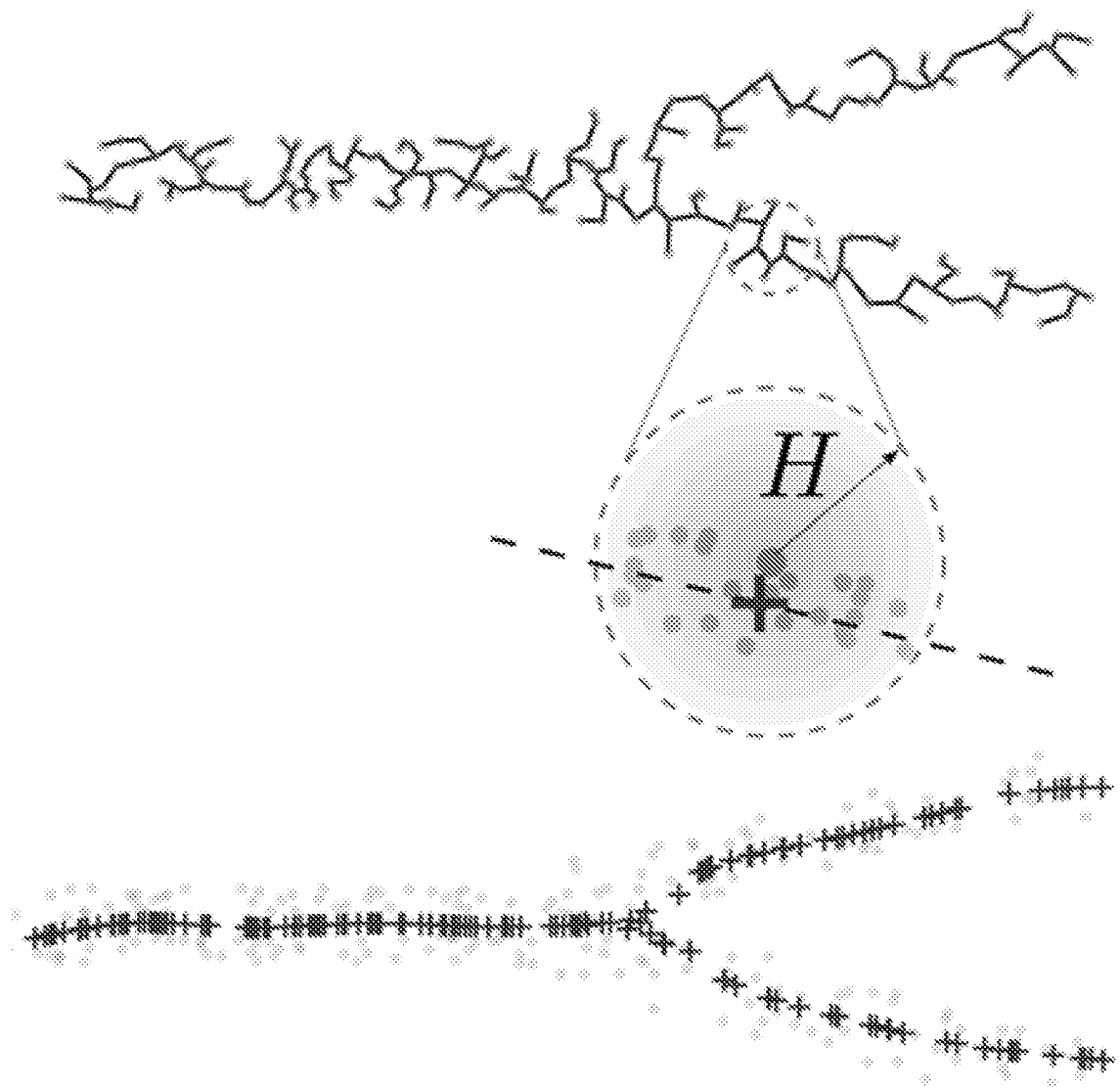
FIG. 10 depicts a scheme for characterizing a vessel's structure from a point cloud, according to some embodiments of the present disclosure.

FIG. 10 depicts a scheme for characterizing a vessel's structure from the point cloud described in reference to FIG. 9. For each super-resolved point $r_i=(x_i, z_i)^T$, a local linear regression can be computed from all points within distance H with Gaussian-weighting. In some examples, a radius H can be chosen according to an approximate vessel size. The regression line $z_{fit}=a+bx$ is found from:

$$\begin{pmatrix} a \\ b \end{pmatrix} = (X^T W X)^{-1}(X^T W z).$$ Equation 14

In Equation 14, W is a diagonal weighting matrix, z is a column matrix of the z-coordinates of the points in the neighborhood, and $$X \equiv \begin{pmatrix} 1 & | \\ \vdots & x_j \\ 1 & | \end{pmatrix}$$ Equation 15

Gaussian weighting was used such that $$W_{jj} = \exp\left[-(\|r_i - r_j\|/H)^2\right]$$ Equation 16

Once the local regression is computed, the super-resolved peaks can be projected onto this best fit line by setting $s=(1, b+a)^T$ and computing $$r_p = \frac{r \cdot s}{s \cdot s} s$$ Equation 17

This process may be iterated N times to further collapse the points onto a single line, which may be taken as an estimation of the vessel's center. In three dimensions, points can be projected onto the principal direction of the points within distance H. The principal direction can be computed from the singular value decomposition (SVD) of the matrix formed by the super-resolved bubble locations.

iii. Spatial Segmentation of Vessels

In cases where two or more vessels are separated by distances about H, the regression calculation can be limited to points which are associated with the same vessel. An EMST can be computed in these cases to estimate the connectivity of the point cloud. In this way, separate vessels can be segmented by removing any edge whose length exceeds a threshold number k of standard deviations from the mean edge length of the EMST. While the local regression and projection, with or without the EMST, allows the vessel center to be found, it may not give information as to the size of the vessel. An estimation of the vessel diameter can be obtained for each point by projecting all n points within the neighborhood onto the regression line calculated for that point. The diameter of the vessel can be taken to be a number of times mean of these distances (i.e., the mean distance is taken to represent half the vessel radius). For illustration and not limitation, the diameter of the vessel can be taken to be 4 times mean of these distances:

$$d \approx 4 \frac{1}{n} \sum_{j=1}^{n} \|r_j - r_{p,j}\|$$ Equation 18

When multiple projections were performed, this distance was computed on the first iteration.

iv. Temporal Segmentation and Velocity Segmentation

Figure 11:
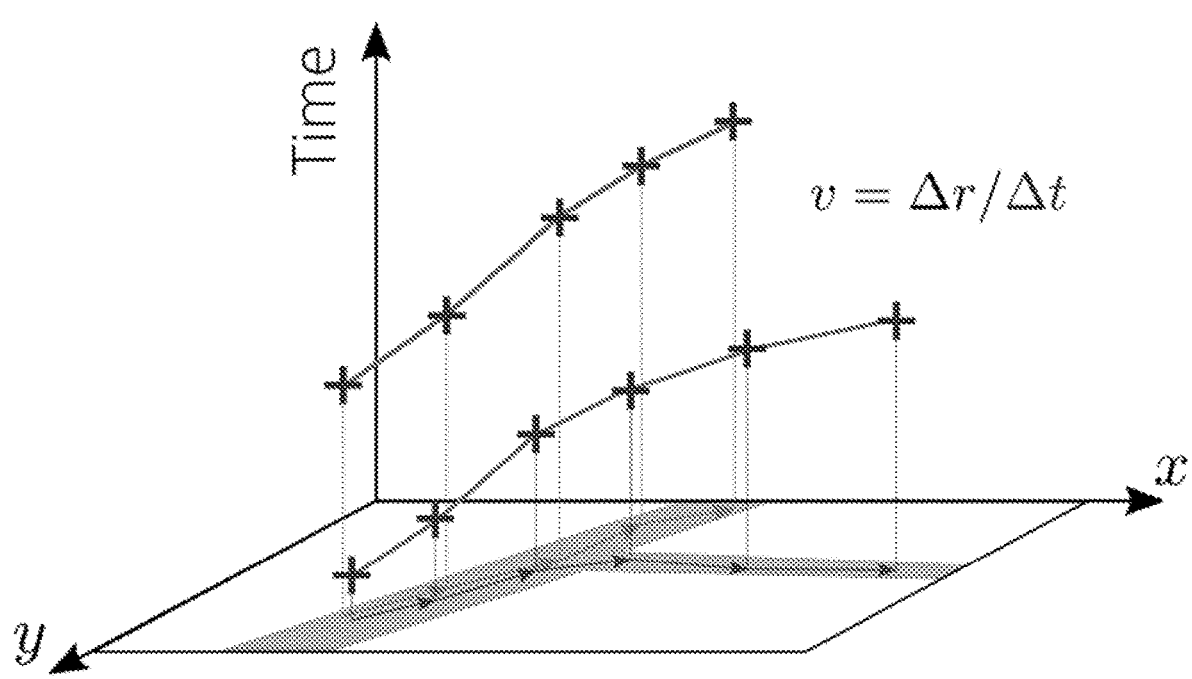
FIG. 11 is a graph providing an example of how time coordinates can be assigned to microbubble point locations, according to some embodiments of the present disclosure.

As the EMST can be computed in arbitrary dimension, SR bubble positions may be associated in time by assigning an additional time coordinate to the points. FIG. 11 is a graph providing an example of how the time coordinate can be assigned. Although separate, individual bubbles may be collocated in space, and the sparsity constraint requires some separation in time. Therefore, segmentation of longer EMST branches enables identification of individual bubble trajectories. The velocity of the bubble between SR positions $r_n$ and $r_{n+1}$ (measured at time points $t_n$ and $t_{n+1}$) is then approximately the finite difference $$v \approx \frac{\|r_{n+1} - r_n\|}{t_{n+1} - t_n}$$ Equation 19

In the computation of length of the EMST branches, the inclusion of the temporal dimension requires scaling such that its dimension is comparable with the spatial dimension. For the velocity computations presented here, the temporal and spatial distribution of the data points were scaled to have zero mean and standard deviation of unity. The time points were then scaled by a factor of 100.

Figure 12A:
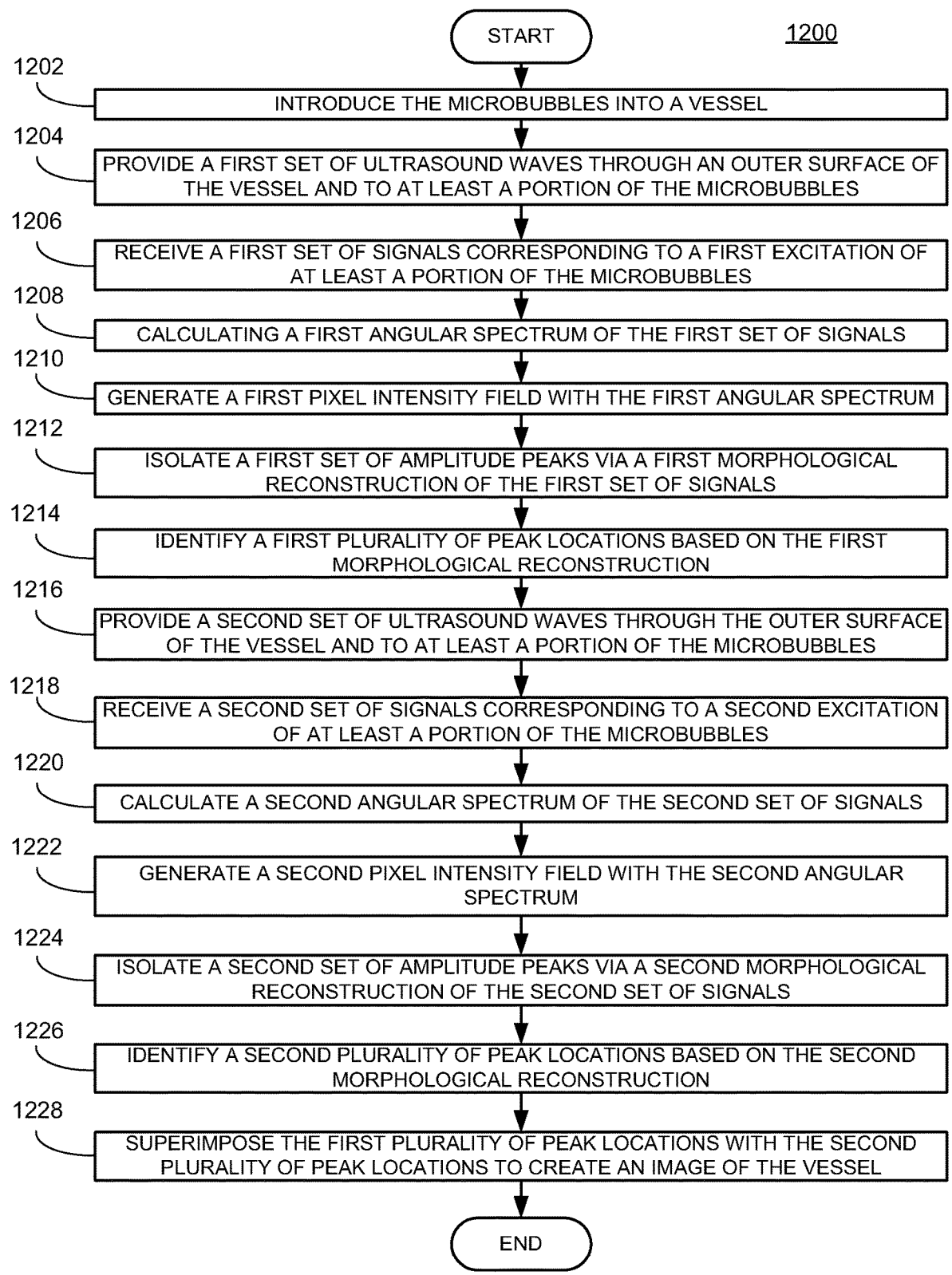
FIG. 12A is flowchart of an example method of imaging using ultrasound waves and microbubbles, according to some embodiments of the disclosure.

FIG. 12A is a flowchart of an example method 1200 of imaging using ultrasound waves and microbubbles, according to some embodiments of the present disclosure. In step 1202, method 1200 includes introducing the microbubbles into a vessel. In block 1204, method 1200 includes providing, by a transducer, a first set of ultrasound waves through an outer surface of the vessel and to at least a portion of the microbubbles. In block 1206, method 1200 includes receiving, at a receiver, a first set of signals corresponding to a first excitation of at least a portion of the microbubbles. In block 1208, method 1200 includes calculating a first angular spectrum of the first set of signals. In some examples, this calculation can be completed using Equations 1-4 above.

In block 1210, method 1200 includes generating a first pixel intensity field (e.g., a PAM) with the first angular spectrum. In block 1212, method 1200 includes isolating a first set of amplitude peaks via a first morphological reconstruction of the first set of signals, as described above. Using the information from the first morphological reconstruction, step 1214 includes identifying a first plurality of peak locations in the data set.

In blocks 1216-1226, the processes described above for steps 1204-1214 are repeated for a second set of ultrasound waves. In step 1226, this enables the system to identify, after a second morphological reconstruction (see step 1224), a second plurality of peak locations. In block 1228, method 1200 includes superimposing the first plurality of peak locations with the second plurality of peak locations to create an image of the vessel (e.g., a point cloud that creates an image of the vessel).

Figure 12B:
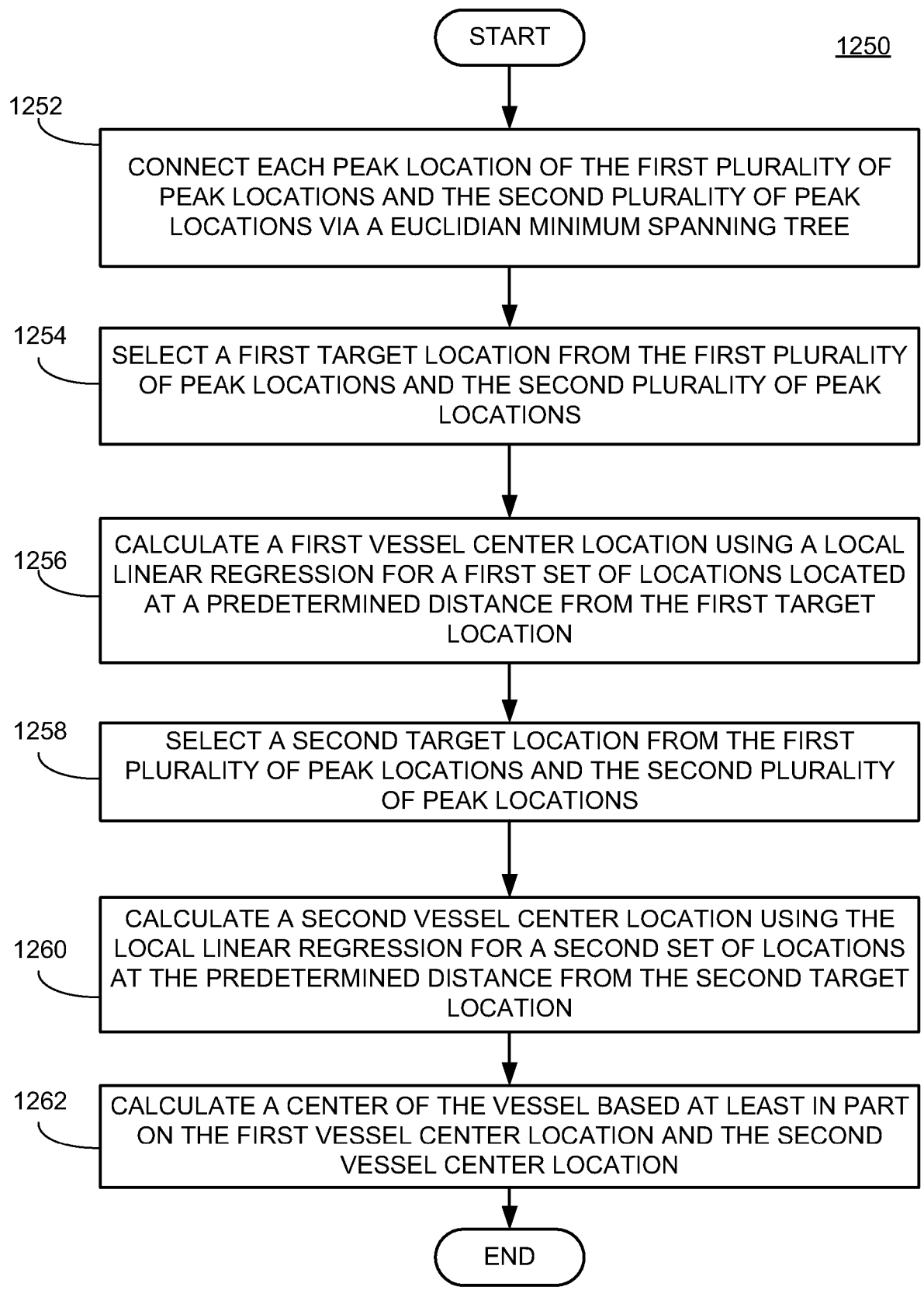
FIG. 12B is a flowchart of an example method for calculating the centers of a vessel, according to some embodiments of the present disclosure.

In some examples, method 1200 can end after block 1228. In other examples, additional steps can be performed according the examples described herein. Additional steps, for example, can be taken to estimate the vessel center, which can further enable mapping the estimated diameter of the vessel. FIG. 12B is a flowchart of an example method 1250 for calculating the center of a vessel. Method 1250 can be completed once the first plurality of peak locations and the second plurality of peak locations have been identified in method 1200 of FIG. 12A. In step 1252, method 1250 includes connecting each peak location of the first plurality of peak locations and the second plurality of peak locations via a Euclidian minimum spanning tree. This step can create a spiderweb-like representation of the vessel, as shown in FIG. 10. In step 1254, method 1250 includes selecting a first target location from the first plurality of peak locations and the second plurality of peak locations. In step 1256, method 1250 includes calculating a first vessel center location using a local linear regression for a first set of locations located at a predetermined distance from the first target location. In step 1258, method 1250 includes selecting a second target location from the first plurality of peak locations and the second plurality of peak locations.

In step 1260, method 1250 includes calculating a second vessel center location using the local linear regression for a second set of locations at the predetermined distance from the second target location. An example of this step is described above in reference to FIG. 10, where linear regression can be computed from all points within distance H with Gaussian-weighting. In step 1260, method 1250 includes calculating a second vessel center location using the local linear regression for a second set of locations at the predetermined distance from the second target location. In step 1262, method 1250 includes calculating a center of the vessel based at least in part on the first vessel center location and the second vessel center location. As will be appreciated, the local linear regression can be completed for all locations in the first set of locations and the second set of locations. In some examples, method 1250 can end after step 1262. In other examples, additional steps can be performed according to the examples described herein.

B. Simulations of Super-Resolution Imaging

The methods described above were evaluated using numerical simulations. Acoustic simulations were performed using k-Wave including linear propagation effects. A binary map was created from a trace the B-mode image of the vessel phantom used for the experiment, or of a shape designed to test the effects of the algorithm. One to four sources were placed randomly (with a minimum separation of 4 mm to ensure spatial separation in the PAMs) within the locations associated with the inside of the vessel. Each bubble's radius time series R(t) was computed from the large-amplitude bubble model. Bubble properties were estimated for commercially available protein microbubbles based on data measured in previous studies. The applied pressure field was taken to be a 20-cycle windowed sine pulse at 1.662 MHz (as used in the experiments). The resulting pressure radiated by the bubble was taken to be $$p_{rad}(r, t) = \frac{\rho_0}{r}(\ddot{R}R + 2\dot{R}^2)$$  Equation 20 where dots denote time derivatives and $\rho_0$ is the liquid density. For the simulation, the specified source pressure was then evaluated at r=100 μm, corresponding to the discretized spatial step in the simulation. The simulated resulting pressure field was then recorded at locations corresponding to the position and dimensions of the ultrasound array used during the experiment.

For the three-dimensional simulations, a 64-by-64 element virtual 2D array with 500 μm pitch was defined to record the simulated pressure field. Point sources at 1 MHz were randomly simulated within a vessel phantom and helix shape. The lower frequencies and larger dimensions were used to enable use of a coarser simulation grid, and reduction of the required computational resources.

The simulations of microbubble trajectories inside the tube were performed with commercially available modelling software. The flow field inside the tube is modeled using Navier-Stokes equation with an average inlet velocity of 0.5 mm/s, and a reference pressure at tube outlet of 101 kPa. Gas microbubbles (with surface tension to ensure stability) were given initial velocity according to the fluid velocity at inlet and their trajectories are computed using Newton's second law, where the drag force is calculated using Stokes' law $F_{drag}=6\pi R\mu v$, where v is the fluid velocity.

C. Experimental Methods for Super-Resolution Imaging

A vessel-mimicking bifurcation was prepared by joining two polyethylene tubes with inner diameter 280 μm and separating them to form a bifurcation. The protein microbubbles described above in the simulations were diluted to approximately 200 bubbles/μl in a stirred beaker, and continuously drawn through the phantom with a syringe pump during the experiments. A 256-element linear array transducer was positioned in the plane of the vessel phantom (parallel to the bifurcation). The array was connected to a research ultrasound system programmed to operate in passive mode (center 128 channels) to record microbubble emissions (see, for example, FIG. 8).

To record nonlinear emissions from the bubbles free of nonlinear artifacts originating from the excitation pulse of the imaging array, a focused ultrasound (FUS) transducer was used. The transducer was focused on an air-filled tube submerged in a water tank by maximizing the echo recorded by a pulser-receiver, and then scanned in a plane parallel to the plane of the vessel phantom with a 3D positioning system. The FUS excitation signal (sinusoidal, center frequency 1.662 MHz; pulse duration 30 s; focal amplitude 450 kPa) was coded on an arbitrary waveform generator and amplified by a 43 dB amplifier connected to the FUS transducer (center frequency 1.662 MHz; curvature 30 mm and diameter 40 mm). Pulse repetition frequencies up to 20 Hz were used (except when the transducer was repositioned), and the microbubble emissions were recorded during the excitation pulse. The focal pressure was determined via measurement with a calibrated hydrophone with a reported uncertainty of 10% in the frequency range of the excitation.

D. Example Results for Microbubble Imaging with SR Ultrasound

The systems and methods for super-resolution ultrasound provides at least three technical improvements: i) the method for the localization of the bubbles (point sources) in the vessel, ii) the morphological reconstruction for the SR localization of the microbubbles, and iii) the quantification of vessel structure and flow from these point sources. The first constitutes the spectrally resolved supper resolution ultrasound (SRS-US) method, wherein the bubble emissions are recorded (FIG. 8), and the positions of bubbles are determined from the array RF data using the ASA-PAM based on their nonlinear echoes (i.e., harmonics) (FIG. 8, image "i"). In the second, the microbubbles' map (diffraction limited) is combined with morphological reconstruction to isolate peak regions (FIG. 8, images "ii" and "iii") and Gaussian fitting of the PSF (FIG. 8, image "iv") to identify the point sources (below the diffraction limit). This is performed for multiple frames and until many bubbles have been super-localized (FIG. 9). The third is based on EMST, where local regressions are computed in a neighborhood about each bubble point, and connected points are projected onto the computed best-fit line (FIG. 10). Then, statistics about this regression and local distribution of microbubbles are used to estimate the vessel's center, diameter, and flow velocity, as described above.

To demonstrate the performance of the algorithm and asses its temporal and spatial resolution, experimentally validated mathematical modeling (k-Wave) was used to simulate sources that were randomly positioned inside a vessel bifurcation. From the simulated data (169 frames), 326 point sources were super-localized using their nonlinear echoes ($2^{nd}$-$4^{th}$ harmonics) and used to assess the vessel structure. The estimated vessel diameters were approximately 1.5 mm to the left of the bifurcation and 280 m to the right (see FIG. 13B below), both significantly lower than the 3 mm axial resolution of the array and in agreement with the true vessel structure. Computation of the SR points from the RF data and subsequent vessel mapping required less than 30 s on ordinary hardware (4 cores at 2.8 MHz, 8 GB memory) with little optimization (i.e., no parallel processing or GPU acceleration was used).

Figure 13A:
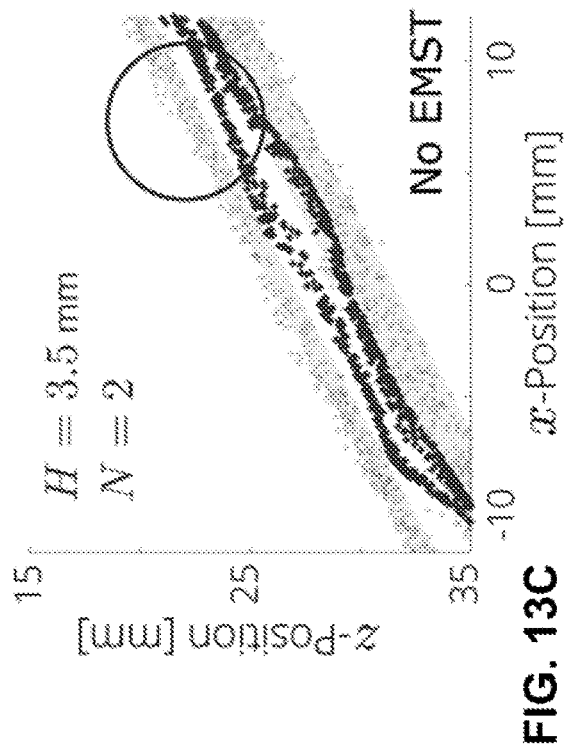
FIGS. 13A-13B are plots showing the results of the spectrally resolved super-resolution ultrasound combined with Euclidean minimum spanning tree (EMST) in bifurcated vessels, according to some embodiments of the present disclosure.
Figure 13B:
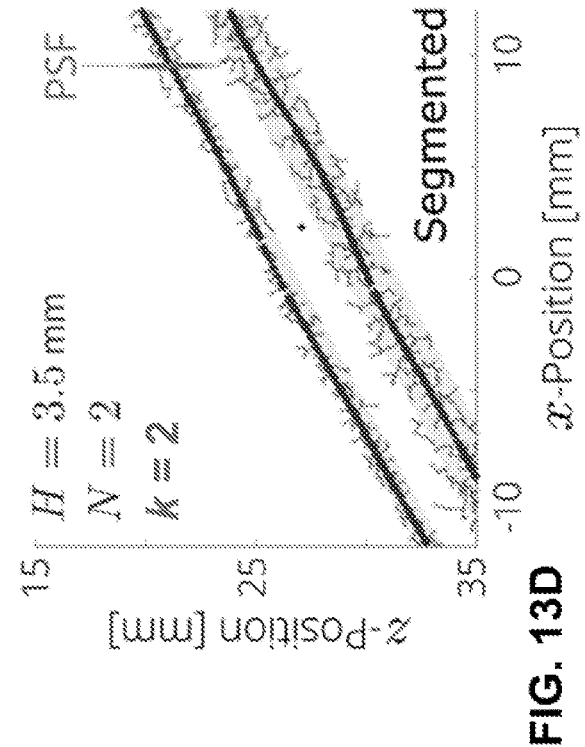

FIGS. 13A-13B are plots showing the results of the spectrally resolved super-resolution ultrasound combined with EMST in bifurcated vessels. FIG. 13A depicts the results from the simulation described above, and FIG. 13B depicts the results from the experiment described above. The plots show the SR bubble locations (circles) and their local projections (crosses), compared with the location of the vessel phantom. As shown in the plots in FIGS. 13A-13B, the experimental performance was similar to the simulated data, with projected peaks lying near the center of the simulated vessel region (FIG. 13B inset). The algorithm successfully estimated the nominal inner diameter of the tubes used during the experiment (280 μm) to the right of the bifurcation, ten times below the observed diffraction limit. For points on the left of bifurcation, approximate vessel diameter of 1.5 mm was computed, which in this case is half the axial dimension of the PSF (3 mm, shown in FIG. 13A). Additionally, the projected points (crosses) fell within the tube center throughout out the bifurcation (FIG. 13B inset). The experimental reconstruction of the vessel used 559 bubble localizations and required less than 1 min, and computation of the EMST and local projection for several hundred points required less than 4 s, which makes this part of the algorithm extremely efficient and compatible with very large datasets and clinical implementations.

Figure 13C:
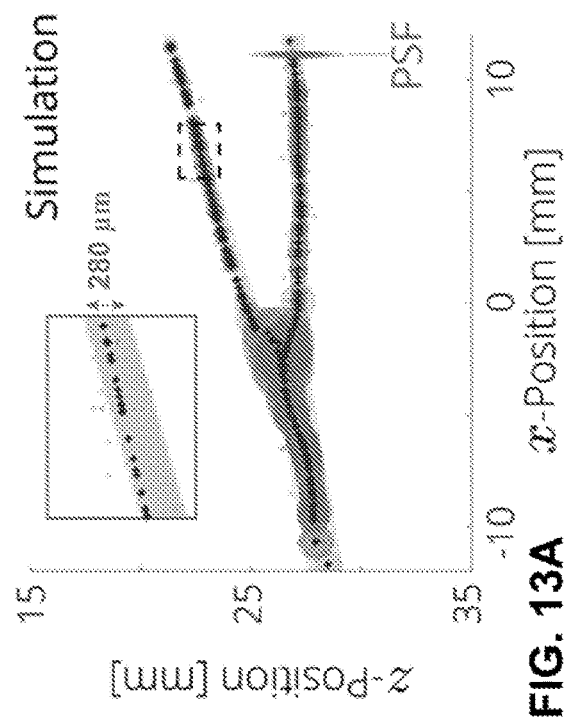
FIGS. 13C-13D are plots showing the results of the spectrally resolved super-resolution ultrasound combined with EMST in two vessels close in distance, according to some embodiments of the present disclosure.
Figure 13D:
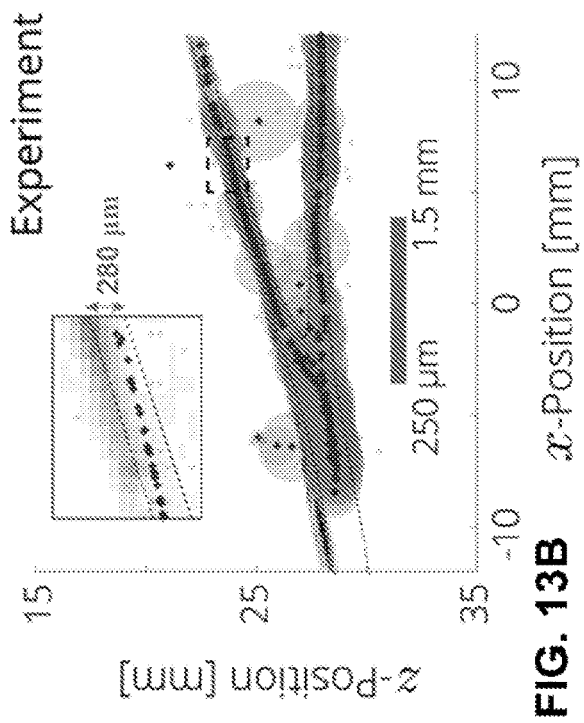

As described above, in cases where two or more vessels are separated by distances about H, the regression calculation can be limited to points which are associated with the same vessel. Separate vessels can be segmented by removing any edge whose length exceeds a threshold number k of standard deviations from the mean edge length of the EMST. FIGS. 13C-13D show the results of imaging of two vessels close in distance. As shown in FIG. 13C, whish does not utilize EMST, when the diameter of the vessel is on the order of the distance between vessels, the local projection with a fixed large neighborhood H may fail to distinguish between the two tubes. In FIG. 13D, however, EMST is used to associate points within the same vessel and to enable resolution of the two vessels. The application of EMST can resolve the individual vessels by eliminating tree edges that are more than two standard deviations from the mean length and by using only connected points to compute the local regression.

Figure 14A:
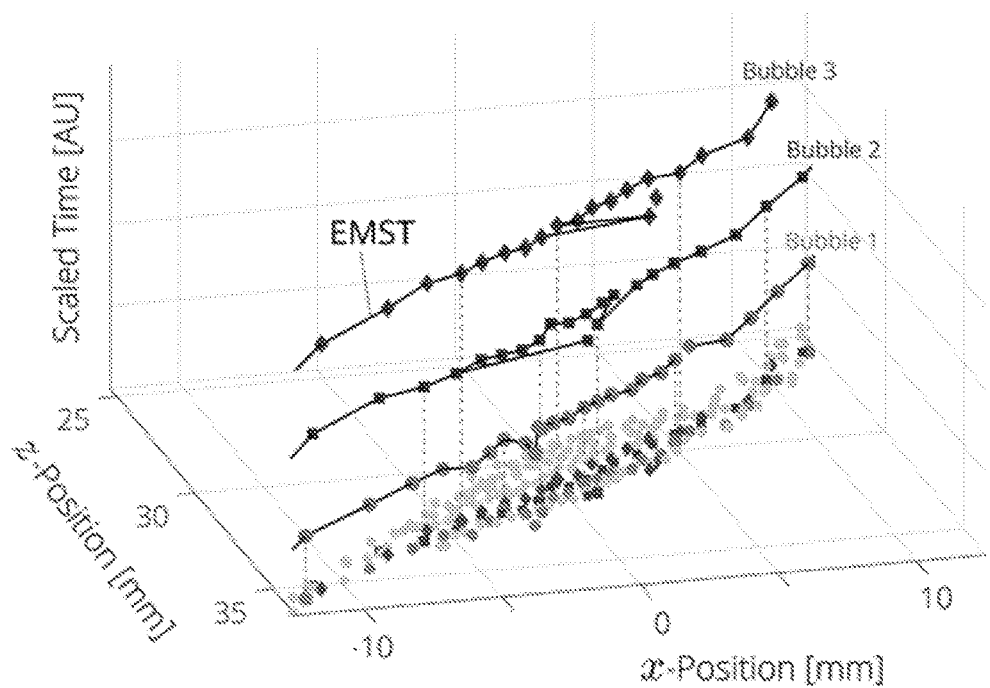
FIGS. 14A-14E are graphs depicting how a spectrally resolved supper resolution ultrasound (SRS-US) method can estimate vascular flow and dimeter, according to some embodiments of the present disclosure.
Figure 14B:
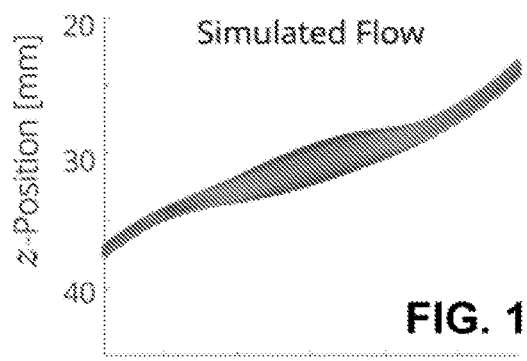
Figure 14D:
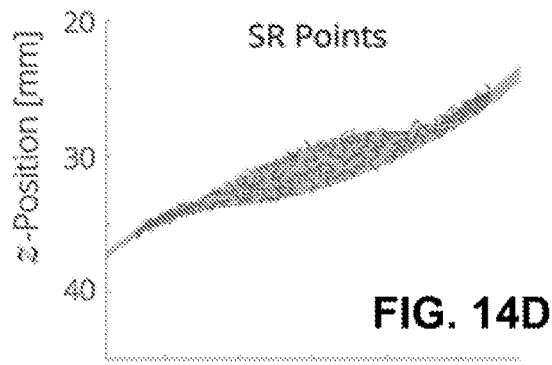
Figure 14C:
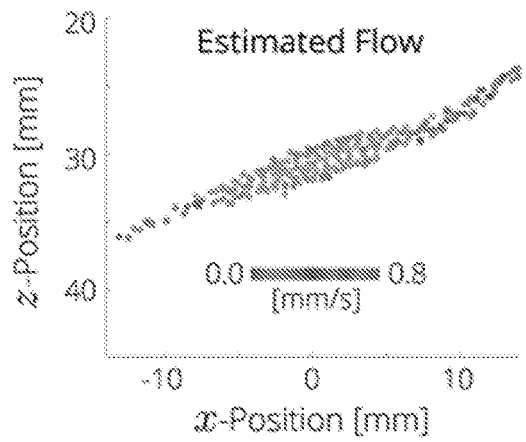
Figure 14E:
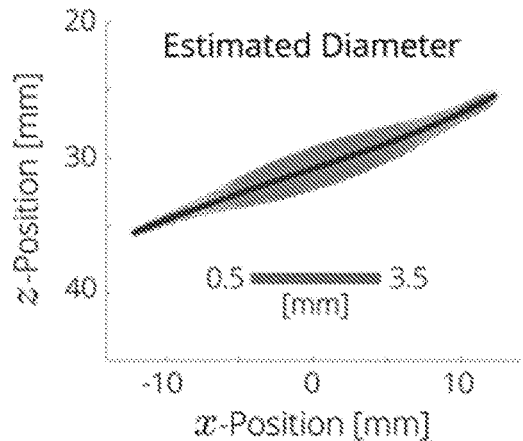

FIGS. 14A-14E are graphs depicting how the spectrally resolved supper resolution ultrasound (SRS-US) method can estimate vascular flow and dimeter. The flow was simulated within the vessel, and bubbles were taken to be excited at regular intervals along the flow paths. FIG. 14A, a time stamp is associated with each bubble location within the frame, and the time dimension is treated as an additional dimension in the EMST. Segmentation with k=1.5 enables isolation of individual bubble traces, despite their overlap in the spatial dimensions (dots). In FIG. 14B, the flow was simulated in the variable width vessel, to define the bubble excitation positions. In FIG. 14C, the flow estimated from the tracing algorithm agrees with the flow field used to simulate the bubbles' motion in the vessel. In the present case, the time dimension was scaled to 100 times that of the spatial dimension. FIG. 14D shows that, for many single bubble simulations, the SR bubble positions (dots) align with the simulated vessel (smooth region). The plot in FIG. 14D shows the accumulated SR points from 804 single bubbles positioned in the vessel, whose diameter varies continuously between 500 μm and 3.5 mm. In FIG. 14E, the vessel center (e.g., crosses from FIG. 13B) and estimated diameter of the vessel were recovered using the projection algorithm.

Figure 15A:
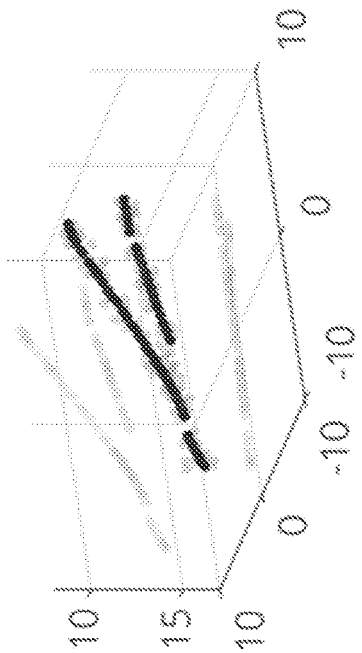
FIGS. 15A-15D are graphs showing the resulting reconstructions and local projections of simulating point sources within a three-dimensional vessel phantom, according to some embodiments of the present disclosure.
Figure 15B:
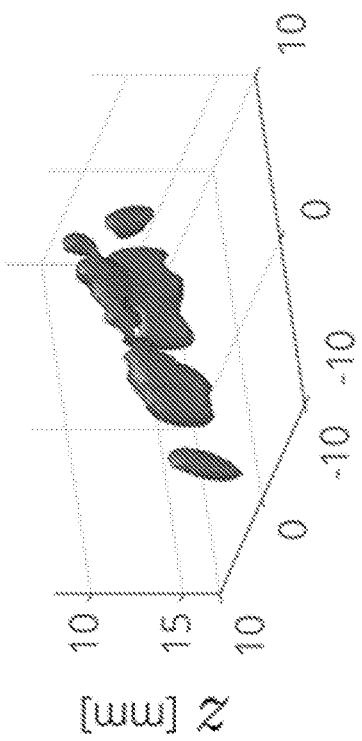
Figure 15C:
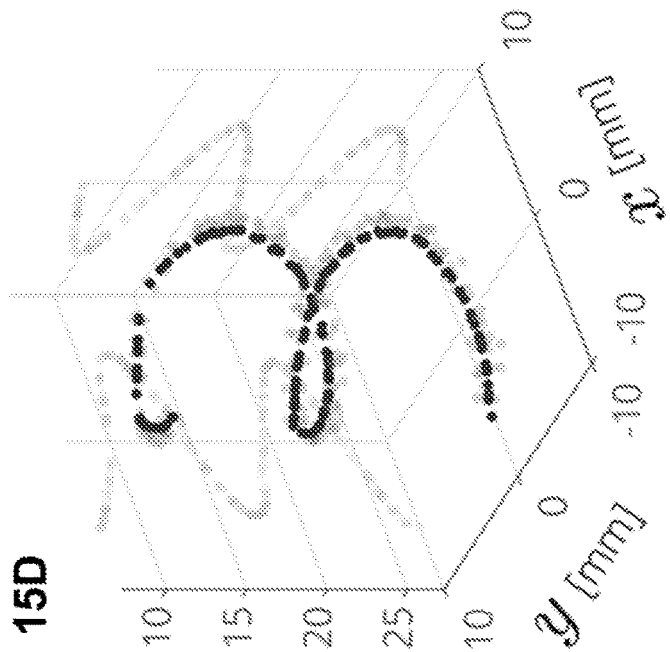
Figure 15D:
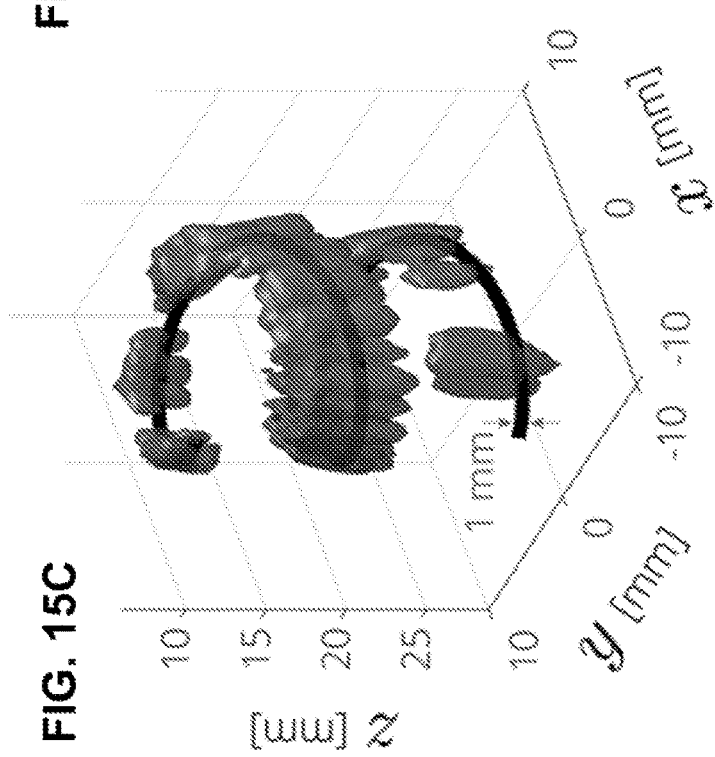

The systems and methods described herein can be readily extended to three (or four) dimensions when image acquisition is performed with a 2D array. FIGS. 15A-15D are graphs showing the resulting reconstructions and local projections of simulating point sources within a three-dimensional vessel phantom and within 1 mm of a helix with radius 6 mm and 1 cm pitch. The vessel phantom had the same dimensions as in the 2D simulations and experiments described above. FIGS. 15A and 15B depict images of data from 213 simulated data points from the bifurcated vessel phantom with N=1, H=5 mm, and k=2 (FIG. 15A is a diffraction-limited image, and FIG. 15B is a super-resolved image using the ASA-PAM methods described herein). FIGS. 15C and 15D depict data from 358 simulated sources in a 1 mm diameter helix shape with N=1, H=5 mm, and k=2

(FIG. 15C is a diffraction-limited image, and FIG. 15DB is a super-resolved image using the ASA-PAM methods described herein). Reconstructions with ASA-PAM required approximately 200 ms per frame, compared with 40 ms for the 2D case, and projection of the SR points required less than 1 s; thus, the images in FIGS. 15A-15D require less than 2 min to compute (358 frames). Interestingly, the axial resolution is effectively constant throughout the imaging volume and does not degrade over the range of penetration depths studied (i.e. isotropic voxel), as it happens with the diffraction limited reconstruction (FIG. 15C), providing a significant advantage for characterizing vascular morphology at different penetration depths concurrently.

III. Closed Loop Spatial and Temporal Controller

In some examples, the present systems and methods can include closed-loop controllers based on the imaging techniques described above. In some examples, the imaging can include a closed-loop real-time nonlinear state controller (the control law is used to control nonlinear dynamics) based on harmonic, ultra-harmonic, and broadband frequency bands as observer states to control the acoustic exposure level and maintain desired levels of acoustic emissions and by extension of cavitation activity.

In some examples, the controller can also expand the ASA-PAM method (or other methods for imaging the microbubble dynamics) described herein to include real-time nonlinear state controller that uses specific frequency bands of the microbubble acoustic emissions (harmonic, ultra-harmonic, etc.) to control cavitation activity (observer states). Although other closed-loop methods based on imaging can be employed, using the ASA-PAM method can offer benefits as it provides i) extremely fast reconstructions of the acoustic field (>3 orders of magnitude faster than time domain methods), ii) frequency selectivity (e.g., harmonics, ultra-harmonics, etc.) that allows the localization of different types of cavitation activity, and iii) high signal-to-noise ratio (SNR) as compared to single-channel passive cavitation detector (PCD) (i.e. SNR is proportional to $\sqrt{N}$, where N is the number of elements used in the reconstruction).

The following systems and methods present a controller that i) adjusts the pressure change ($\Delta P$) from the initial value ($P_0$) according to the level of the harmonic (or ultra-harmonic) signal, ii) selects the sign of the applied pressure (increase or decrease: $\pm \Delta P$) according to the level of the harmonic signal, and iii) incorporates a switch state that is based on the broadband emissions to ensure a predefined level of broadband emissions is not exceeded (i.e. safety state).

A. Controller Design

Figure 16:
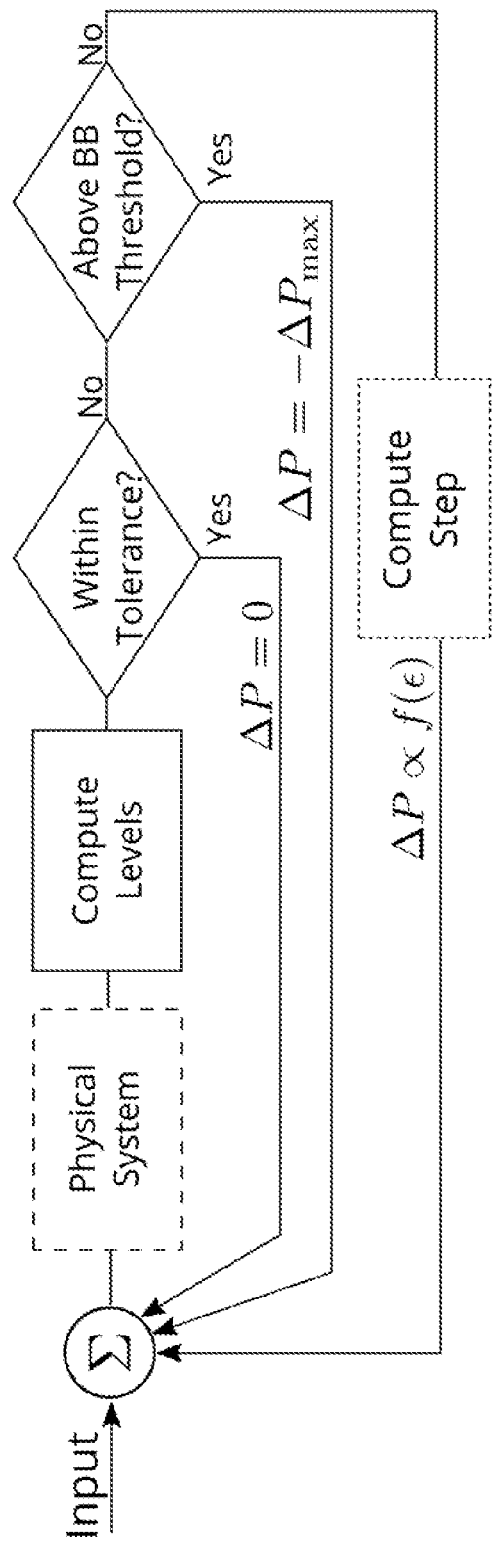
FIG. 16 depicts an example controller logic flow, according to some embodiments of the present disclosure.
Figure 17A:
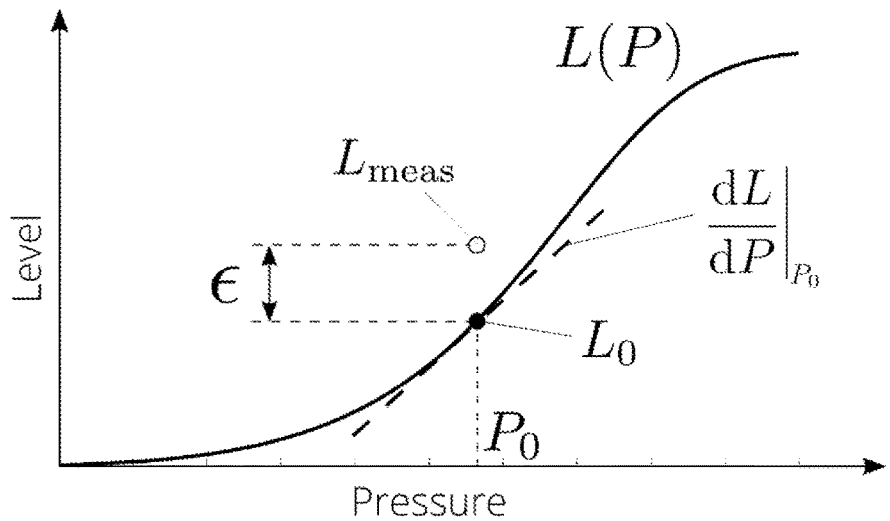
FIGS. 17A-17C are graphs illustrating example parameters for implementing a controller, according to some embodiments of the present disclosure.

FIG. 16 depicts an example controller logic flow, according to some embodiments of the present disclosure. In some examples, the controller can be a nonlinear state controller based on multiple observer states, e.g., harmonic, ultra-harmonic, sub-harmonic, or broadband emissions of the microbubbles. The controller can use as input the first observer state to adjust the step size. When the measured level $L_{meas}$ of the first observer state is sufficiently close to its desired value $L_0$, there is no change in the output pressure. When the measured level $L_{meas}$ of the first observer state is sufficiently close to its desired value $L_0$, there is no change in the output pressure. When the measured level $L_{meas}$ of the first observer state differs from its desired value $L_0$ by more than the tolerance level $\sigma$, the change in the applied pressure ($\Delta P$) is computed according to the following control law:

$$\Delta P = \text{sgn}(L_0 - L_{meas}) \Delta P_{max} \tanh[(\in + \beta)^{-\alpha}] \quad \text{Equation 21}$$

where sgn is the sign function, $\alpha$ and $\beta$ are parameters, and $\in$ is the normalized error magnitude as in FIG. 17A:

$$\in \equiv \frac{|L_{meas} - L(P)|}{L(P)} \quad \text{Equation 22}$$

Figure 17B:
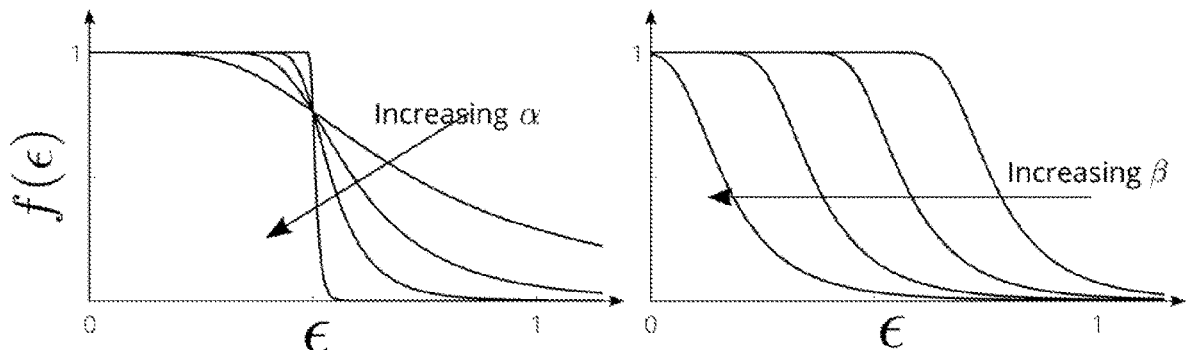

Here, L(P) is the model for the observer state, i.e., the training data. The form of Equation 21 can enable tenability and ensure stability; however, other control law shapes can be used, provided they decrease from a maximum at 0 and vanish for large errors $\in$. The effect of $\alpha$ and $\beta$ on the control law is shown in FIG. 17B. The maximum step size can be computed from the slope of the model equation near the target value $L_0 = L(P_0)$ as follows $$P_{max} = A\sigma \left(\frac{dL}{dP}\bigg|_{P_0}\right)^{-1} \quad \text{Equation 23}$$

Figure 17C:
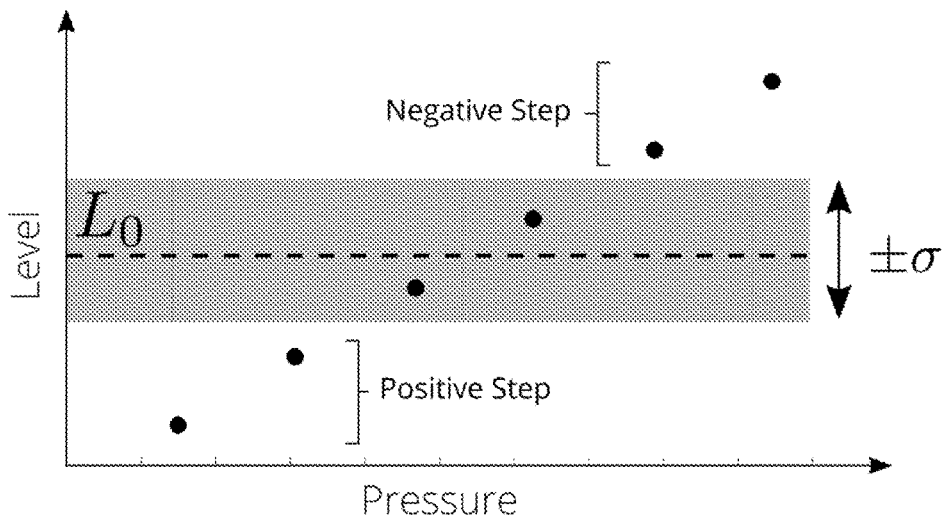

To avoid overshoot (i.e. going past), the target range can be set according to $L_0(1 \pm \sigma)$. Here A is a chosen multiplier that is of order 1. The increase or decrease in applied pressure (second state) is based on whether the measured level L is above or below the desired target range $L_0(1 \pm \sigma)$ (negative if above target and positive if below). This convention is shown in FIG. 17C. An additional observer state (third state) can be incorporated to the controller as a (safety) switch condition (e.g., if it is above a threshold, then a maximum negative step can be applied). Note that in the presently described controller system, the step, the sign, and the switch can be controlled by any observer state described above, including sub-harmonics.

While active methods have been used for microbubble imaging, PAM methods as described above enables capture of data during the sonication without interfering with the therapy pulse. For completeness, the ASA algorithms are described above in reference to Equations 1-4. PAMs for the controller can be created by computing the intensity I at each point (x, z) within the field of interest, i.e., $$I(x, z) = \left|\mathcal{F}_x^{-1}\left\{\hat{p}_0 \exp\left[i\sqrt{\omega^2/c_0^2 - k_x^2}\,(z - z_0)\right]\right\}\right|^2 \quad \text{Equation 24}$$

where $\mathcal{F}_x^{-1}$ is the inverse spatial transform. In some examples, linear acoustic propagation can be assumed. More complicated fields with multiple frequencies (i.e., microbubble emissions) can be expressed as a summation of the individual frequency components.

B. Example Methods for the Controllers

Figure 18:
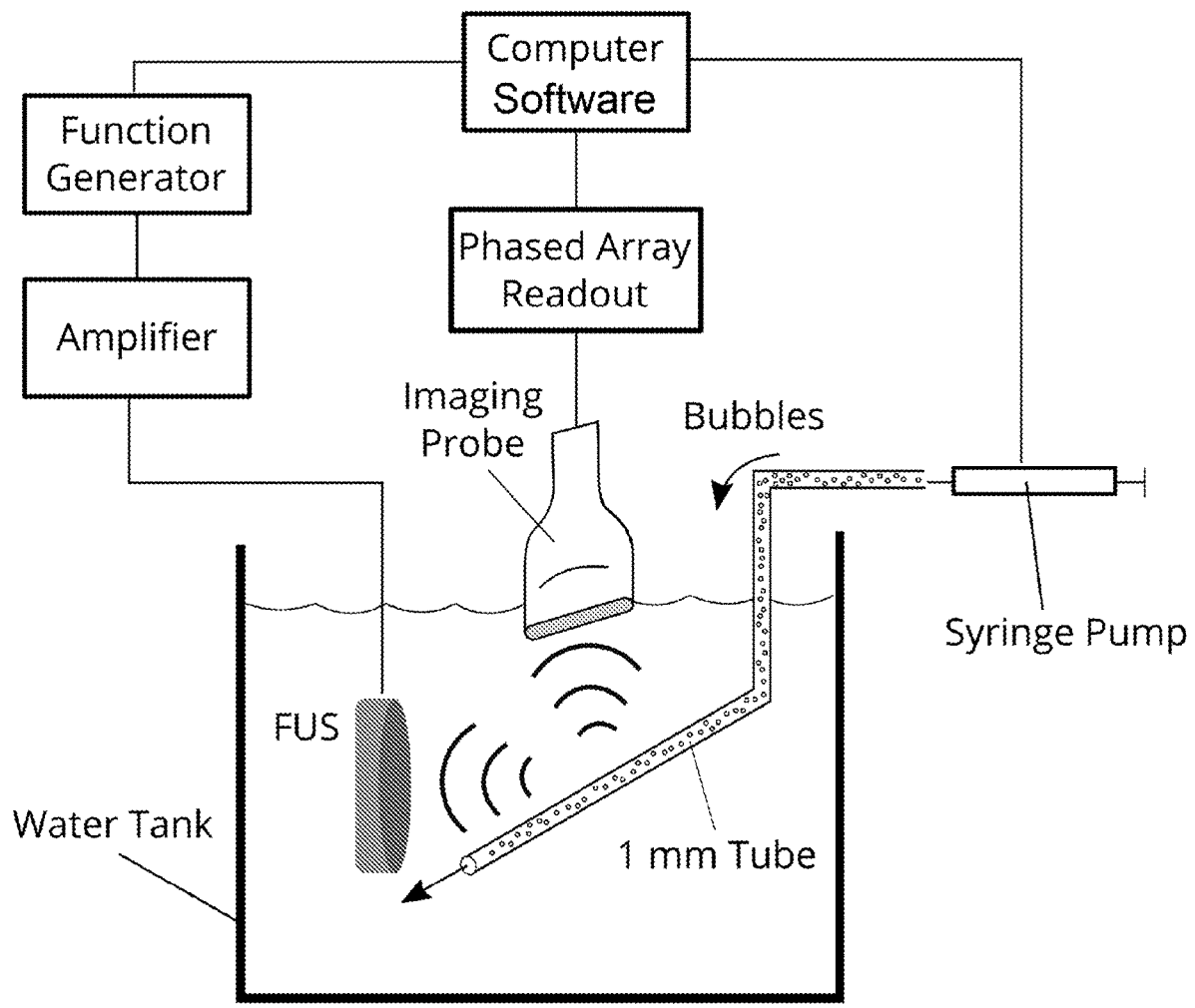
FIG. 18 is an example experimental setup for testing a controller, according to some embodiments of the present disclosure.

An experimental setup was created to test the controllers described herein. FIG. 18 depicts the example experimental setup to test the controller. An excitation waveform (sinusoidal excitation: 1.662 MHz; pulse duration: 60 μs; pulse repetition frequency: 1 Hz) was sent from a waveform generator whose output was passed through a 43 dB amplifier before applied to the FUS transducer (built in house, central frequency 1.662 MHz; curvature 30 mm and diameter 40 mm). The transducer was focused on a 1 mm channel submerged in a water tank by maximizing the echo recorded by a pulser-receiver.

Commercially available protein microbubbles, like those previously described herein, were diluted to approximately 6000 bubbles per microliter in a 10 ml syringe (unless otherwise stated), and manually agitated before injection into the channel. A syringe pump was programmed to infuse bubbles continuously during all experiments (sonications) shown in the current paper at approximately 16 mm/s. A 256 element linear array transducer (200 µm element spacing, 50 mm total aperture) was positioned at a right angle to the incident beam. The array was connected to a research ultrasound system that was programmed to operate in passive mode (center 128 channels, 20 MHz sampling frequency) to record microbubble emissions. The recorded bubble emissions were used to create PAMs from emissions in the harmonic, ultra-harmonic, and broadband frequency ranges using the ASA algorithm above in Equation 24.

The experimental PAM implementation used axial resolution of 0.5 mm, pad factor of 4, frequency bin width of 5, and reconstruction region 100 mm (509 pixels) transverse by 35 mm (71 pixels) axial. For these settings, the reconstruction time was approximately 40 ms per level. All hardware was synchronized and controlled with custom code. All reported pressures were determined using a calibrated a hydrophone with a reported uncertainty of ±10% in the frequency range of the excitation.

i. Example Controller Implementation

The benefit of the controller presented herein is passive acoustic mapping can be completed for any frequency domain of interest. For example, the physics of the microbubbles may warrant populating a pixel intensity field (e.g., a PAM) at a 2nd harmonic, a 3rd harmonic, etc. The controller enables the system (or a user of the system) to select a desired frequency from any frequency domain in which to populate the PAM. The following controller setup describes using a 3rd harmonic of the microbubbles, which is in accordance with some embodiments.

In the controller implementation, the third harmonic is used as a control state and to determine the step of $\Delta P$, the third harmonic or the third ultra-harmonic as a second observer state that is used to determine the sign of $\Delta P$ (both implementations are described herein), and the broadband emissions as switch third state (safety condition). See FIG. 16 for the controller logic flow. Acoustic emission levels based on PAM were calculated by integrating the intensity of the PAM at each frequency: $3f_0$ (4.986±0.019 MHz) for the harmonic (H3), $3.5 f_0$ (5.817±0.019 MHz) for ultra-harmonic (U3), and $2.72f_0$, $3.22f_0$, $3.72f_0$, and $4.22f_0$ (4.52, 5.35, 6.18, 7.01±0.019 MHz), for the broadband (BB; these values were chosen to avoid harmonic and ultra-harmonic contributions). These example frequencies were chosen in this implementation because i) they are clinically relevant, ii) in this range the array tested had its highest sensitivity, and iii) they are associated only with cavitation activity; when no bubbles were present in the tube, the levels of these frequencies did not change for the pressure range used (20 to 110 kPa).

The results were compared against the PCD. Single-channel PCD levels were computed from the center channel only using the same frequency bins used in the PAM. The threshold for the broadband emissions (safety condition) was taken to be about 1% above the baseline broadband level. To assess the performance of the controller at different noise levels, zero mean, normally distributed noise was added to the data before processing.

Two general controller shapes were chosen for comparison based on preliminary testing using a range of parameters. These were termed "sharp" and "smooth" based on the shape of their control laws (see, for example, FIG. 17B) and represent reasonable but distinct controller performance. The parameters for each are listed in Table 3. In the current implementation each controller loop, which included the emissions recording, the PAM reconstruction, the parameter extraction, and updating the pressure value based on the controller decision, required approximately 500 ms. In some examples, this computation time could be reduced for other applications as needed, perhaps to a few tens of milliseconds, by use of lower spatial resolution for the PAMs, smaller sampling frequencies, narrower bandwidth, shorter acquisition times, or by use of parallel computing or use of GPUs.

TABLE 3

| Name | A | α | β |
| --- | --- | --- | --- |
| Smooth | 2 | 7 | 0.99 |
| Sharp | 1 | 10 | 0.8 | ii. Controller Calibration

The target state of the controller was determined from training data collected by monotonically increasing the applied pressure (20 to 110 kPa) to determine thresholds for the onset of harmonic and ultra-harmonic (stable), and broadband (inertial) cavitation. From the training data, non-linear fits of the expected level L as a function of applied pressure P were computed for U3, H3 and BB according to $$L(P)=a_1 \tanh (a_2 P+a_3)+a_4 \qquad \text{Equation 25}$$

where the $a_i$ are constants optimized to fit the data. While a range of functions can be used (e.g. polynomial, power law, etc.), the form of Equation 25 was chosen because it provides a single fitting function that enables reasonable fits of the differing nonlinear data trends for each frequency component (e.g., H3, BB). Six measurements were made at each applied pressure, and their mean value was fit with Equation 25.

Figures 19A, 19B:
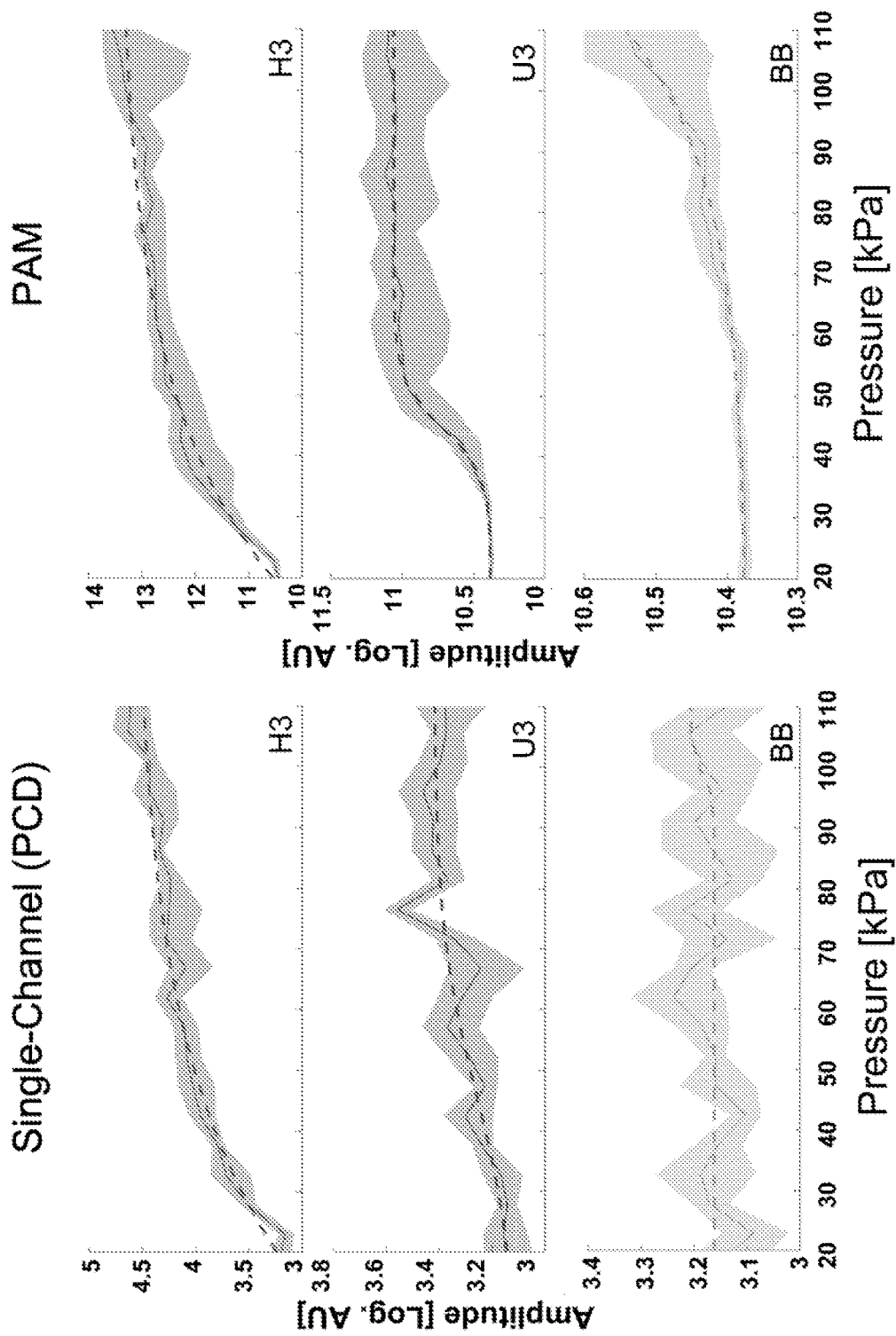
FIGS. 19A-19B are graphs showing the emission level fits as a function of applied pressure for a single-channel and PAM, according to some embodiments of the present disclosure.

FIGS. 19A (PCD) and 19B (PAM) show the emission level fits as a function of applied pressure for each frequency: $3f_0$ (4.986±0.019 MHz) for the harmonic (H3), $3.5f_0$ (5.817±0.019 MHz) for ultra-harmonic (U3), and $2.72f_0$, $3.22f_0$, $3.72f_0$, and $4.22f_0$ (4.52, 5.35, 6.18, 7.01±0.019 MHz), for the broadband. For the PAM, the computed level was found not to depend strongly on the region over which the intensity was summed (provided the bubble region was included) or the axial resolution used. Therefore, for simplicity, in all PAM values presented here a reconstruction region that was 35 mm in transverse and 35 mm in axial direction, respectively, was used.

iii. Controller Performance Metrics

The following metrics can be used to quantify the performance of the controllers.

Rise time is the number of steps before H3 reaches or exceeds target value (smaller is better). The rise time measures how quickly the desired state can be achieved; while only the step number was recorded during experiments, successive sonications were found to be separated by 970±40 ms; according to this estimation the rise times were converted to seconds.

Proximity ratio $\chi$ is the fraction of measured levels within the tolerance of the target level (larger is better)

$$\chi \equiv \frac{\text{No. of Seps within Tolerance}}{\text{Total Steps}} \quad \text{Equation 26}$$

The proximity ratio is a measure of how often the controller maintains the level of H3 to within the specified tolerance $\sigma$.

Normalized variability $\zeta$ measures how closely overall the level of H3 is kept to the target level. One standard deviation of the measured H3 levels were within $\zeta$ percent of the target level (smaller is better):

$$\zeta \equiv 100 \times \frac{\text{Std. Deviation of Proximity}}{\text{Target Level}} \quad \text{Equation 27}$$

A perfect controller has a small rise time, proximity ratio of unity ($\chi \rightarrow 1$), and a vanishing normalized variability ($\zeta \rightarrow 0$).

C. Example Results for the Controllers

The training data for the proposed nonlinear state controller were collected from multiple measurements with linearly increasing applied pressure using FUS excitation and concurrent recording of acoustic emissions of bubbles that were flowing through a plastic tube with a linear array operated in passive mode (see FIG. 18). With a single channel recording from the center element of the imaging array the threshold for the detection of third harmonic (H3) was at 33±3 kPa (i.e., the pressure level at which the harmonic level was 5 standard deviations above its baseline value). The third ultra-harmonic (U3) and broadband (BB) emissions level did not exceed the detection threshold (5 standard deviations above baseline value) for the pressure levels applied. Inspection of the plots in FIG. 19A indicates that the threshold for the onset of U3 and BB were on the order of 70 kPa and 100 kPa, respectively. Computing the levels with all elements acting as a single active surface gave a moderate improvement in detection of the acoustic emissions. This is because the size of the array is significantly longer than a wavelength and comparable to the distance from the source, which limits the increase in sensitivity due to the larger effective area used. When no bubbles were present, the levels for H3, U3, and BB emissions did not deviate from the baseline in this pressure range, indicating the absence of finite amplitude propagation effects in the pressures employed in this study. With PAM at H3, U3, and BB frequency bands a well localized peak was observed at pressure levels of 23±3 kPa, 38±5 kPa, and 73±5 kPa respectively (see FIG. 19B). As compared to the single channel values, the higher sensitivity PAM allowed detecting cavitation activity more consistently, in addition to providing spatial information. Therefore, unless otherwise stated, PAM was selected as the H3, U3 and BB detection method to test performance of the controller.

After the system using the cavitation threshold measurements was characterized, the performance of the controller with a single observer state, namely the level of H3, was examined for two representative controller shapes: smooth and sharp (see FIG. 17B). FIGS. 20A-20B are graphs of the results of this examination of controller shapes. The control law parameters (i.e. controller shapes) were chosen based on preliminary testing in which the control laws resulted in controllers with different rise times and normalized variabilities (see Table 3). Using single observer state, the step size was determined by the difference between the measured and modeled level of H3; that is, the level L in the definition of the normalized error e in Equation 22 was the level of the third harmonic. The rise time was generally shorter for the smooth controller (4.2±1.2 s) than for the sharp controller (7.8±1.9 s), as the maximum step size was larger for the smooth case (see FIG. 20C). The proximity ratio (FIG. 20), the normalized variability, and the mean applied pressure were very similar for both control laws ($\chi$=0.56 and 0.57, $\zeta$=3.7 and 3.6; 53±7 kPa and 55±6 kPa, for smooth and sharp respectively). The difference between the two shapes suggest that the controller is relatively insensitive to the specific parameter values, however the smooth control law is slightly better due to shorter rise time.

i. Controller Performance with Multiple Observer States

The next experiment determined the controller performance by incorporating an additional observer state: that is the level of the third ultra-harmonic (U3) was used to control the size of the step. FIGS. 21A-21E are graphs showing the results of experiments on the controller with an additional observer state, according to some embodiments of the present disclosure. FIG. 21A shows the measured level of the third harmonic (H3) compared with target value (dashed black line) and tolerance (gray region). FIG. 21B shows the applied pressure at each step for a representative run with the smooth and sharp control laws. (C) Rise times; error bar represents the standard error (5 runs). FIG. 21D is a histogram of proximity of H3 level to target value, i.e., the difference between all measured levels (after the target level was first reached) and the target value (dashed black line) in terms of the tolerance o-. Vertical scale is 40 counts. FIG. 21E shows the measured acoustic emission levels of the third harmonic (H3), third ultra-harmonic (U3), and broadband (BB) components for the smooth control law. BB level has been lowered by 1.5 dB for clarity. FIG. 21F is a histogram of all measured BB levels across all runs compared to threshold value (solid yellow line).

While, the two controller shapes had similar rise times (4.6±0.2 s for the smooth and 5.2±1.0 s for the sharp) and normalized variability ($\zeta$=3.3 vs $\zeta$=3.5), the smooth control law had a larger proximity ratio than did the sharp control law ($\chi$=0.63 vs $\chi$=0.49; FIG. 21C). As compared to single observer state controller (H3) the multiple observer states controller (H3/U3) had similar rise time but larger proximity ratio. The increased performance is directly related to the multiple independent states used (H3 and U3). Thus, the smooth control law, with U3 as the level controlling the step size resulted in the largest fraction of time spent within the tolerance of the desired level, indicating that this combination provides the best performance according to this embodiment. This implementation was used as a reference controller for the remaining experiments (nominal condition). Note that in the above implementations, an additional switch state based on BB emissions was active, but the BB level never exceeded the specified threshold (1% higher than the baseline), indicating that throughout the experiment a desired level of stable cavitation was achieved.

IV. Systems to Employ the Present Methods

Figure 22:
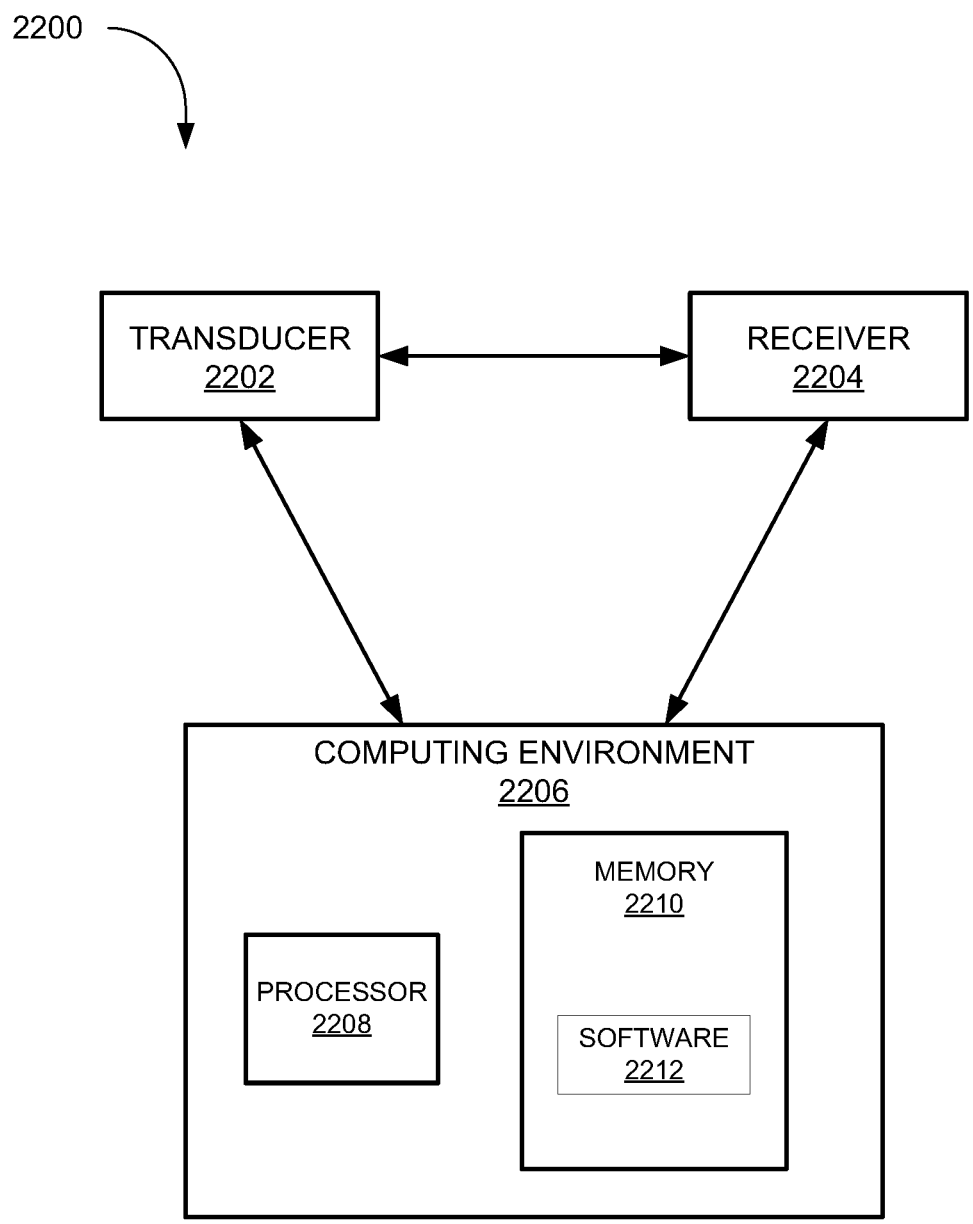
FIG. 22 is an example system including components that can employ the methods described herein, according to some embodiments of the present disclosure.

The systems and methods described herein can be performed with ultrasound systems that include a transducer and a receiver. FIG. 22 is an example system 2200 including components that can employ the methods described herein, according to some embodiments of the present disclosure. A system 2200 can include a transducer 2202. The transducer 2202 can be a device that produces sound waves across a surface and to a region of interest. The system can a receiver 2204. The receiver 2204, e.g., a sensor, can receive the radio frequency (RF) signals of the ultrasound waves bouncing off of a scatterer within the region of interest. In some examples, the transducer 2202 and the receiver 2204 can be a single piece of equipment that both transmits ultrasound waves and receives RF signals.

A system 2200 for performing the steps described herein can a computing environment 2206. The computing environment 2206 can be a computer or ultrasound workstation including computing comments. The computing environment 2206 can include one or more processors 2208. The one or more processors 2208 can perform some of the calculations and transformations described herein, including but not limited to calculating an angular spectrum, generating a pixel intensity field, phase correcting an angular spectrum, determining desired pressure levels in which to target a point within the region of interest, calculate and connect peak regions via a Euclidian minimum spanning tree, and/or the like. The processor 2208 can include one or more of a microprocessor, microcontroller, digital signal processor, co-processor or the like or combinations thereof capable of executing stored instructions and operating upon stored data. The processor 2208 can be in communication with the transducer 2202 and/or the receiver 2204.

The computing environment 2206 can also include a memory 2210. The memory can be in communication with the processor 2208. The memory 2210 can include instructions, for example software 2212 or other application, that causes the processor 2208 to perform any of the methods described herein, including those listed above in reference to the processor. The memory 2210 can include, in some implementations, one or more suitable types of memory (e.g., volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data.

In some examples, the transducer 2202, receiver 2204, memory 2210, one or more processors 2208, and the like can be incorporated into a single device such that the methods described herein can be performed in a clinical setting.

TABLE 4

Roman Letters

| | |
|---|---|
| c | Sound speed |
| $c_0$ | Reference (average) sound speed |
| f | Frequency |
| g | Green's function |
| k | Wavenumber $k = \omega/c$ |
| $k_0$ | Reference wavenumber $k_0^2 = (\omega/c_0)^2 = k_x^2 + k_y^2 + k_z^2$ |
| $\tilde{p}$ | Harmonic pressure amplitude ($\mathcal{F}[p] = \tilde{p}$) |
| P | Angular spectrum (spatial Fourier transform) of harmonic pressure ($\mathcal{F}_k[\tilde{p}] = P$) |
| p | Acoustic pressure |
| r | Position vector $r = (x, y, z)$ |
| R | Tukey window taper parameter (R = 1 for Hann window, R = 0 for rectangular window). |

TABLE 5

Greek Letters

| | |
|---|---|
| α | Attenuation |
| β | Absorption power law exponent |
| Λ | Angular spectrum of auxiliary function $\Lambda = \mathcal{F}_k[\lambda]$ |
| λ | Auxiliary function $\lambda = k_0^2(1 - \mu)$ |
| μ | Sound speed coefficient $\mu(r) = c_0^2/c^2(r)$ |
| ω | Angular frequency $\omega = 2\pi f$ |
| ρ | Acoustic density |
| τ | Time delay |

TABLE 6

Mathematical Notations

| | |
|---|---|
| * | 2D convolution $f * g = \iint_{-\infty}^{\infty} f(k_x - k_x', k_y - k_y', z) g(k_x, k_y, z) dk_x' dk_y'$ |
| ∇ | Gradient operator |
| ∇· | Divergence operator |
| $\nabla^2$ | Laplacian operator |
| $\mathcal{F}$ | Temporal Fourier tranform $\mathcal{F}[\cdot] = \int_{-\infty}^{\infty}(\cdot) e^{i\omega t} dt$ |
| $\mathcal{F}_k$ | Spatial Fourier transform $\mathcal{F}_k[\cdot] = \iint_{-\infty}^{\infty}(\cdot) e^{-i(k_x x + k_y y)} dx dy$ |

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. Instead, it is intended that the invention is defined by the claims appended hereto.

What is claimed is:

1. A method of imaging using ultrasound waves and microbubbles comprising:
   introducing microbubbles into a vessel;
   providing ultrasound waves through an outer surface of the vessel and to at least a portion of the microbubbles;
   receiving a first set of signals corresponding to a first excitation of at least a portion of the microbubbles;
   receiving a second set of signals corresponding to a second excitation of at least a portion of the microbubbles;
   isolating a first set of amplitude peaks via a first morphological reconstruction of the first set of signals;

isolating a second set of amplitude peaks via a second morphological reconstruction of the second set of signals;
identifying a first plurality of peak locations based on the first morphological reconstruction;
identifying a second plurality of peak locations based on the second morphological reconstruction;
connecting each peak location of the first plurality of peak locations and the second plurality of peak locations via a Euclidian minimum spanning tree;
selecting a first target location from the first plurality of peak locations and the second plurality of peak locations;
calculating a first vessel center location using a local linear regression for a first set of locations located at a predetermined distance from the first target location;
selecting a second target location from the first plurality of peak locations and the second plurality of peak locations;
calculating a second vessel center location using the local linear regression for a second set of locations at the predetermined distance from the second target location; and
calculating a center of the vessel based at least in part on the first vessel center location and the second vessel center location.

2. The method of claim 1 further comprising:
calculating an angular spectrum of the first set of signals and the second set of signals; and
generating a pixel intensity field;
wherein:
  providing the ultrasound waves comprises:
    providing a first set of ultrasound waves propagating at a first sound speed; and
    providing a second set of ultrasound waves propagating at a second sound speed being different than the first sound speed;
  the angular spectrum is at least in part based on the first sound speed and the second sound speed; and
  the pixel intensity field is generated with the angular spectrum.

3. The method of claim 2 further comprising phase correcting the angular spectrum based at least in part on the first sound speed and the second sound speed.

4. The method of claim 1, wherein the first set of the signals and the second set of the signals correspond to radio frequency data associated with the microbubbles.

5. The method of claim 1 further comprising at least one of:
calculating a first angular spectrum of the first set of signals;
calculating a second angular spectrum of the second set of signals;
calculating the first angular spectrum of the first set of signals and generating a first pixel intensity field with the first angular spectrum;
calculating the second angular spectrum of the second set of signals and generating a second pixel intensity field with the second angular spectrum; or
calculating the first angular spectrum of the first set of signals and generating the first pixel intensity field with the first angular spectrum, calculating the second angular spectrum of the second set of signals and generating the second pixel intensity field with the second angular spectrum, and superimposing the first plurality of peak locations with the second plurality of peak locations to create an image of the vessel.

6. A system for localizing a source with ultrasound waves comprising:
a transducer configured to provide the ultrasound waves;
a receiver configured to receive signals produced by the ultrasound waves interacting with microbubbles;
a processing platform comprising at least one processor, the processing platform in communication with the transducer and the receiver; and
a memory in communication with the processing platform and storing instructions that, when executed, cause the system to:
  provide, by the transducer, a first set of ultrasound waves through an outer surface of a vessel and to at least a portion of the microbubbles;
  receive, at the receiver, a first set of signals corresponding to a first excitation of at least a portion of the microbubbles;
  calculate, with the processing platform, a first angular spectrum of the first set of signals;
  generate, with the processing platform, a first pixel intensity field with the first angular spectrum;
  isolate, with the processing platform, a first set of amplitude peaks via a first morphological reconstruction of the first set of signals;
  identify a first plurality of peak locations based on the first morphological reconstruction;
  provide, by the transducer, a second set of ultrasound waves through the outer surface of the vessel and to at least a portion of the microbubbles;
  receive, at the receiver, a second set of signals corresponding to a second excitation of at least a portion of the microbubbles;
  calculate, with the processing platform, a second angular spectrum of the second set of signals;
  generate, with the processing platform, a second pixel intensity field with the second angular spectrum;
  isolate, with the processing platform, a second set of amplitude peaks via a second morphological reconstruction of the second set of signals;
  identify a second plurality of peak locations based on the second morphological reconstruction;
  connect, with the processing platform, each peak location of the first plurality of peak locations and the second plurality of peak locations via a Euclidian minimum spanning tree;
  select, with the processing platform, a first target location from the first plurality of peak locations and the second plurality of peak locations;
  select, with the processing platform, a second target location from the first plurality of peak locations and the second plurality of peak locations;
  calculate, with the processing platform, a first vessel center location using a local linear regression for a first set of locations located at a predetermined distance from the first target location;
  calculate, with the processing platform, a second vessel center location using the local linear regression for a second set of locations located at the predetermined distance from the second target location;
  calculate, with the processing platform, a center of the vessel based at least in part on the first vessel center location and the second vessel center location; and
  superimpose, with the processing platform, the first plurality of peak locations with the second plurality of peak locations to create an image of the vessel.

7. The system of claim 6, wherein the instructions further cause the system to:

calculate, with the processing platform, a mean distance between:
- the first vessel center location and the first set of locations; and
- the second vessel center location and the second set of locations; and estimate, with the processing platform, a diameter of the vessel based on the mean distance.

8. The system of claim 6, wherein the first set of signals corresponds to at least one of a harmonic acoustic frequency, an ultraharmonic acoustic frequency, or a sub-harmonic acoustic frequency of the microbubbles.

9. The system of claim 6, wherein the instructions further cause the system to:
- filter, with the processing platform, the first pixel intensity field to create a first marker image; and
- filter, with the processing platform, the second pixel intensity field to create a second marker image;
- wherein the first morphological reconstruction is based at least in part on the first marker image and the first pixel intensity field; and
- wherein the second morphological reconstruction is based at least in part on the second marker image and the second pixel intensity field.

10. The system of claim 6, wherein the vessel is a human blood vessel.

11. A system for localizing a source with ultrasound waves comprising:
- a transducer configured to provide the ultrasound waves;
- a receiver configured to receive signals produced by the ultrasound waves interacting with microbubbles;
- a processing platform comprising at least one processor, the processing platform in communication with the transducer and the receiver; and
- a memory in communication with the processing platform and storing instructions that, when executed, cause the system to:
  - provide, by the transducer, a first set of ultrasound waves through an outer surface of a vessel and to at least a portion of the microbubbles;
  - provide, by the transducer, a second set of ultrasound waves through the outer surface of the vessel and to at least a portion of the microbubbles;
  - receive, at the receiver, a first set of signals corresponding to a first excitation of at least a portion of the microbubbles;
  - receive, at the receiver, a second set of signals corresponding to a second excitation of at least a portion of the microbubbles;
  - calculate, with the processing platform, a first angular spectrum of the first set of signals;
  - calculate, with the processing platform, a second angular spectrum of the second set of signals;
  - generate, with the processing platform, a first pixel intensity field with the first angular spectrum;
  - generate, with the processing platform, a second pixel intensity field with the second angular spectrum;
  - isolate, with the processing platform, a first set of amplitude peaks via a first morphological reconstruction of the first set of signals;
  - isolate, with the processing platform, a second set of amplitude peaks via a second morphological reconstruction of the second set of signals;
  - identify a first plurality of peak locations based on the first morphological reconstruction;
  - identify a second plurality of peak locations based on the second morphological reconstruction;
  - connect, with the processing platform, each peak location of the first plurality of peak locations via a Euclidian minimum spanning tree;
  - assign, with the processing platform, a first time stamp for a first location of the first plurality of peak locations;
  - connect, with the processing platform, each peak location of the second plurality of peak locations via the Euclidian minimum spanning tree;
  - assign, with the processing platform, a second time stamp for a second location of the second plurality of peak locations; and
  - calculate, with the processing platform, a flow rate through the vessel based on the first time stamp, the second time stamp, and a distance between the first location and the second location.

12. The system of claim 6 or claim 11, wherein:
- the first set of ultrasound waves propagate at a first sound speed;
- the second set of ultrasound waves propagate at a second sound speed;
- the first angular spectrum is based at least in part on the first sound speed; and
- the second angular spectrum is based at least in part on the second sound speed.

13. The system of claim 12, wherein:
- the first set of the signals comprises a plurality of frequencies;
- the first pixel intensity field is populated based at least in part on a desired frequency of the plurality of frequencies; and
- the instructions further cause the system to select the desired frequency from the plurality of frequencies in which to populate the first pixel intensity field.

14. The system of claim 13, wherein the instructions further cause the system to:
- monotonically increase a pressure level of the first set of ultrasound waves; and
- determine, with the processing platform, a desired frequency range for the microbubbles by identifying a first frequency range from the first set of the signals.

15. The system of claim 13, wherein the instructions further cause the system to:
- measure a plurality of amplitudes of the first set of the signals at the desired frequency;
- calculate a desired amplitude of the first set of the signals;
- calculate a desired pressure to achieve the desired amplitude; and
- provide, by a transducing platform comprising the transducer, a third set of ultrasound waves through the outer surface of the vessel, the third set of ultrasound waves providing the desired pressure to the vessel.

16. The system of claim 12, wherein the instructions further cause the system to phase correct, by the processing platform, the angular spectrums, thereby creating phase-corrected angular spectrums.

17. The system of claim 16, wherein the instructions further cause the system to determine, by the processing platform and based at least in part on the phase-corrected angular spectrums, a desired pressure level and desired delay in which to provide a third set of ultrasound waves through the outer surface of the vessel; and
- provide, by a transducing platform comprising the transducer, the third set of ultrasound waves through the outer surface of the vessel.

* * * * *